(12) United States Patent
Attaluri et al.

(10) Patent No.: US 9,940,346 B2
(45) Date of Patent: *Apr. 10, 2018

(54) TWO-LEVEL MANAGEMENT OF LOCKS ON SHARED RESOURCES

(71) Applicant: International Business Machines Corporation, Armonk, NY (US)

(72) Inventors: Gopi K. Attaluri, Sunnyvale, CA (US); James L. Finnie, Toronto (CA); Stewart L. Palmer, New York, NY (US); Piotr M. Plachta, San Jose, CA (US); Garret F. Swart, Palo Alto, CA (US); Xun Xue, Markham (CA); Roger L. Q. Zheng, Richmond Hill (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 382 days.

This patent is subject to a terminal disclaimer.

(21) Appl. No.: 14/338,452

(22) Filed: Jul. 23, 2014

(65) Prior Publication Data

US 2015/0019739 A1 Jan. 15, 2015

Related U.S. Application Data

(63) Continuation of application No. 13/950,414, filed on Jul. 25, 2013, now Pat. No. 8,868,755, which is a continuation of application No. 12/902,116, filed on Oct. 11, 2010, now Pat. No. 8,868,748.

(51) Int. Cl.
*G06F 15/173* (2006.01)
*G06F 17/30* (2006.01)
*G06F 9/52* (2006.01)
*G06F 9/50* (2006.01)

(52) U.S. Cl.
CPC ...... *G06F 17/30362* (2013.01); *G06F 9/5005* (2013.01); *G06F 9/5038* (2013.01); *G06F 9/524* (2013.01); *G06F 9/526* (2013.01)

(58) Field of Classification Search
CPC .. G06F 9/524; G06F 17/30362; G06F 9/5005; G06F 9/3891
USPC .......... 709/202, 224, 226; 710/200; 718/104
See application file for complete search history.

(56) References Cited

U.S. PATENT DOCUMENTS

| | | |
|---|---|---|
| 4,399,504 A | 8/1983 | Obermarck et al. |
| 5,161,227 A | 11/1992 | Dias et al. |
| 5,285,528 A | 2/1994 | Hart |

(Continued)

*Primary Examiner* — Madhu Woolcock
(74) *Attorney, Agent, or Firm* — Erik K. Johnson; Edell, Shapiro & Finnan, LLC

(57) ABSTRACT

In a shared data system comprising one or more primary nodes and a plurality of secondary nodes, global lock manager on a primary node manages locks for shared resources by exchanging an abstract lock state with local lock managers on the secondary nodes. The abstract lock state includes a particular representation of all of the applications on the nodes that are requesting or are granted locks. The exchange of these particular lock states instead of individual requests improves performance by increasing concurrency and reducing off-machine communication. A global deadlock detector on a node detects and resolves global deadlocks, in conjunction with local deadlock detectors on the secondary nodes.

20 Claims, 13 Drawing Sheets

(56) References Cited

U.S. PATENT DOCUMENTS

| | | | |
|---|---|---|---|
| 5,287,521 A * | 2/1994 | Nitta | G06F 9/526 707/999.008 |
| 5,339,427 A | 8/1994 | Elko et al. | |
| 5,454,108 A | 9/1995 | Devarakonda et al. | |
| 5,551,046 A | 8/1996 | Mohan et al. | |
| 5,596,754 A | 1/1997 | Lomet | |
| 5,978,839 A | 11/1999 | Okuhara et al. | |
| 6,041,384 A | 3/2000 | Waddington et al. | |
| 6,088,757 A | 7/2000 | Boonie et al. | |
| 6,148,300 A * | 11/2000 | Singhal | G06F 9/52 |
| 6,493,804 B1 * | 12/2002 | Soltis | G06F 12/0815 707/999.009 |
| 6,499,031 B1 * | 12/2002 | Hopmann | G06F 21/6218 |
| 6,668,295 B1 | 12/2003 | Chan | |
| 6,704,767 B1 * | 3/2004 | Simmons | G06F 9/526 707/999.008 |
| 6,748,470 B2 * | 6/2004 | Goldick | G06F 9/52 707/999.008 |
| 6,772,255 B2 * | 8/2004 | Daynes | G06F 9/52 707/999.008 |
| 6,910,039 B2 * | 6/2005 | Daynes | G06F 9/52 |
| 6,922,694 B2 * | 7/2005 | Daynes | G06F 9/526 |
| 6,965,893 B1 | 11/2005 | Chan et al. | |
| 7,047,299 B1 | 5/2006 | Curtis | |
| 7,093,230 B2 | 8/2006 | E et al. | |
| 7,117,481 B1 * | 10/2006 | Agesen | G06F 9/526 717/120 |
| 7,137,119 B1 | 11/2006 | Sankaranarayan et al. | |
| 7,150,019 B1 * | 12/2006 | Simmons | G06F 9/524 709/208 |
| 7,403,945 B2 | 7/2008 | Lin et al. | |
| 7,739,245 B1 | 6/2010 | Agarwal et al. | |
| 8,352,658 B2 | 1/2013 | Tarta et al. | |
| 8,458,517 B1 * | 6/2013 | Vermeulen | G06F 11/1458 709/201 |
| 8,566,298 B1 * | 10/2013 | Nagaralu, Sr. | G06F 17/30362 707/704 |
| 2004/0054861 A1 | 3/2004 | Harres | |
| 2004/0068563 A1 | 4/2004 | Ahuja et al. | |
| 2004/0225742 A1 | 11/2004 | Loaiza et al. | |
| 2005/0289143 A1 * | 12/2005 | Oshri | G06F 17/30171 |
| 2006/0004758 A1 * | 1/2006 | Teng | G06F 17/30362 |
| 2006/0265420 A1 | 11/2006 | Macnaughton et al. | |
| 2006/0288144 A1 | 12/2006 | Chan et al. | |
| 2008/0209422 A1 | 8/2008 | Coha | |
| 2008/0282244 A1 | 11/2008 | Wu et al. | |
| 2010/0088476 A1 | 4/2010 | Inagaki | G06F 9/526 711/152 |
| 2011/0276690 A1 | 11/2011 | Whitehouse | |
| 2011/0282850 A1 * | 11/2011 | Kamra | G06F 17/30171 707/704 |
| 2012/0089735 A1 | 4/2012 | Attaluri et al. | |
| 2014/0032765 A1 | 1/2014 | Attaluri et al. | |

* cited by examiner

TWO-LEVEL MANAGEMENT OF LOCKS ON SHARED RESOURCES

CROSS REFERENCE TO RELATED APPLICATIONS

The present application is a Continuation of, and claims priority to, U.S. Nonprovisional application Ser. No. 13/950,414, filed 25 Jul. 2013 and entitled "Two Level Management of Locks on Shared Resources", which is a Continuation of U.S. Nonprovisional application Ser. No. 12/902,116, filed 11 Oct. 2010 and entitled "Two Level Management of Locks on Shared Resources," the disclosures of which are incorporated herein by reference in their entireties.

BACKGROUND

1. Technical Field

The present invention relates generally to lock management, and more particularly to improving the performance of lock management for locks on shared resources.

2. Discussion of Related Art

Distributed data systems have long used "locking" as a means for ensuring data integrity in a shared resource. At its most fundamental level, locking a resource is a technique used by an application to prevent its use by another application until the locking application is finished with it, this locking technique being termed "exclusive" locking. In large systems, where data sharing and parallel transaction processing is the rule, if becomes increasingly important to insure that locking does not result in unnecessary delay of transactions. In distributed and parallel systems, the various nodes typically rely on message passing for the sharing of information, and the processing overhead associated with these messages for coordinating between large numbers of nodes is significant. Thus, more efficient means of concurrency control are needed.

BRIEF SUMMARY

Accordingly, embodiments of the present invention include methods, computer program products and systems for managing locks on shared resources in a distributed computer system comprising receiving at a first primary node a first local lock state from a first secondary node of a plurality of secondary nodes, wherein the first local lock state comprises a lock request for access to a shared resource by one or more tasks on the first secondary node, and a requested lock mode, at the first primary node, evaluating the first local lock state to determine whether if is stale, and if yes, discarding the first local lock state, at the first primary node, if the first local lock state is not stale, granting the lock request if no conflicts exist, and otherwise adding the first local lock state to a priority queue for the shared resource and processing the priority queue for the shared resource, at the first primary node, generating a first global lock state in response to the first local lock state, wherein the first global lock state comprises a holdable lock mode that is granted to the first secondary node for the shared resource, and communicating the first global lock state from the first primary node to the first secondary node.

Further embodiments of the present invention include methods, computer program products and systems for managing locks on shared resources in a distributed computer system comprising a first primary node comprising a first processor and a first memory having a plurality of priority queues stored therein, a global deadlock detector comprising a second processor and a second memory having lock conflict information stored therein, and a plurality of secondary nodes each comprising a plurality of tasks, wherein the plurality of secondary nodes collectively comprises a plurality of shared resources, and wherein the plurality of priority queues comprises a priority queue for each shared resource in the plurality of shared resources. The first processor is configured with logic to receive at the first primary node a first local lock state from a first secondary node of the plurality of secondary nodes, wherein the first local lock state comprises a lock request for access to a shared resource in the plurality of shared resources by one or more tasks on the first secondary node, and a requested lock mode, at the first primary node, evaluate the first local lock state to determine whether it is stale, and if yes, discarding the first local lock state, at the first primary node, if the first local lock state is not stale, grant the lock request if no conflicts exist, and otherwise add the first local lock state to a priority queue for the shared resource and processing the priority queue for the shared resource, at the first primary node, generate a first global lock slate in response to the first local lock state, wherein the first global lock state comprises a holdable lock mode that is granted to the first secondary node for the shared resource, and communicate the first global lock state from the first primary node to the first secondary node. The second processor is configured with logic to, at the global deadlock detector, receive and store lock conflict information from two or more secondary nodes, wherein for each secondary node the lock conflict information comprises local lock waits and lock interests for one or more tasks on the secondary node, at the global deadlock detector, detect a global deadlock using the received lock conflict information, wherein a global deadlock is a deadlock between tasks on two or more different secondary nodes, at the global deadlock detector, resolve the detected global deadlocks by selecting one of the deadlocked tasks as a victim, and communicate the victim selection from the global deadlock detector to the secondary node where the selected victim task is located.

The above and still further features and advantages of embodiments of the present invention will become apparent upon consideration of the following detailed description thereof, particularly when taken in conjunction with the accompanying drawings wherein like reference numerals in the various figures are utilized to designate like components.

DETAILED DESCRIPTION

Figure 1:
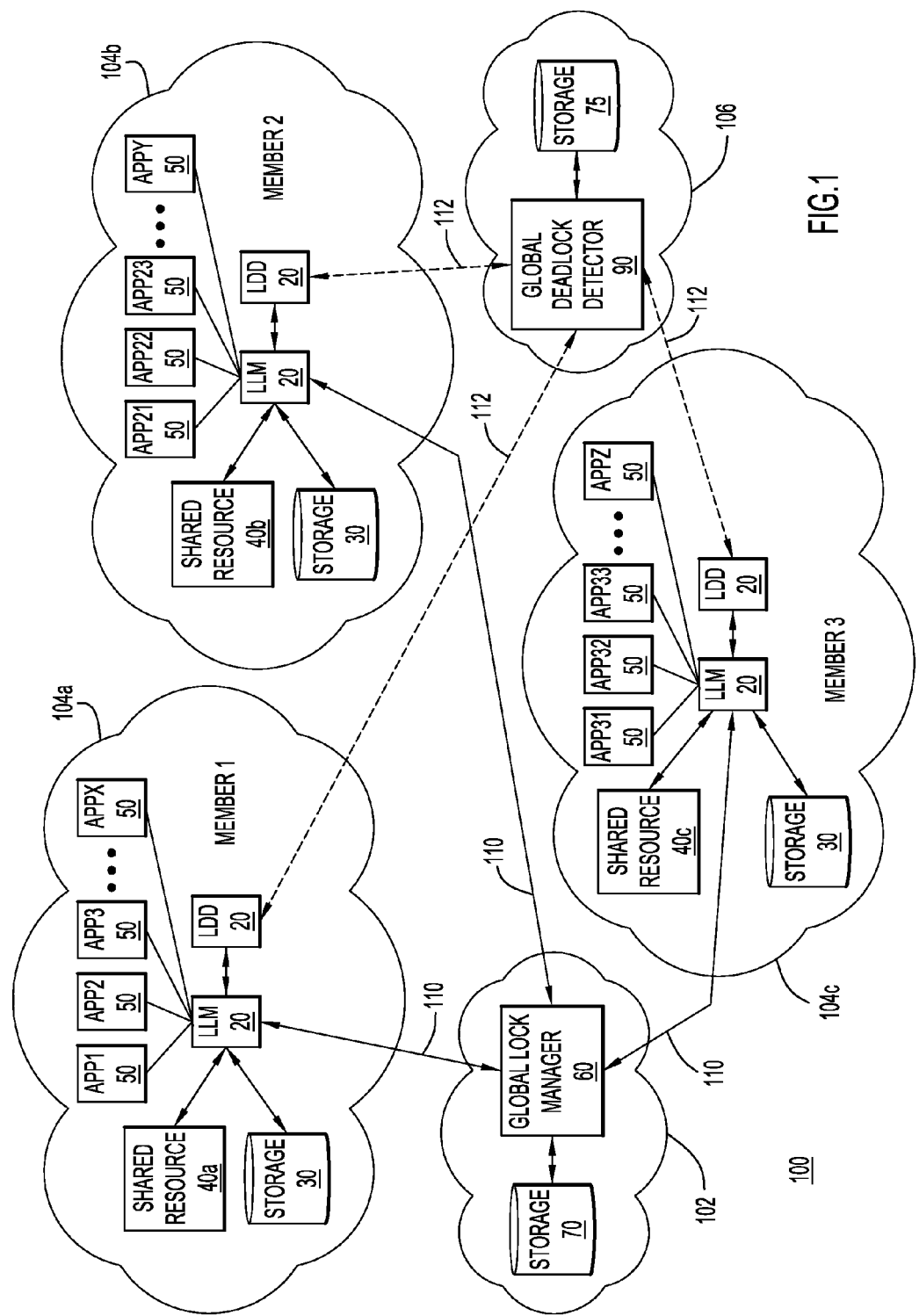
FIG. 1 is a block diagram illustrating an exemplary computer system having a two-level locking system according to an embodiment of the present invention.

Referring now to the Figures, an exemplary computer system 100 according to embodiments of the present invention is illustrated in FIG. 1. The exemplary computer system 100 comprises one or more primary nodes 102 and multiple secondary nodes 104, which are communicatively connected to the primary node(s), for example via communication channels 110, 112. The system 100 may be a distributed computer system, cloud-based system, clustered database, or any other suitable multiple member system in which the present embodiments may be used. Each of the secondary nodes 104 comprises a local lock manager (LLM) 20, storage 30, shared resources) 40, and multiple applications 50, and at least one of the primary nodes 102 comprises a global lock manager (GLM) 60 and storage 70. Each of the secondary nodes 104 in the system also comprises a local deadlock detector (LDD) 80. The system 100 further comprises a global deadlock detector (GDD) 90 and storage 75, which may be located on any suitable node, for example on a central node 106 as shown in FIG. 1, on a primary node 102, or on one of the secondary nodes 104.

The local lock managers 20, the global lock manager 60, the local deadlock detectors 80, and the global deadlock detector 90 may each be implemented in the form of a processing system, or may be in the form of software. They can each be implemented by any quantity of conventional or other computer systems or devices (e.g., computer terminals, personal computers (e.g., IBM-compatible PC, Apple Mac, tablet, laptop, netbook, etc.), etc.), cellular telephones/personal data assistants (e.g., Palm Pre, Droid, iPhone, iPad, etc.), etc., and may include any commercially available operating system (e.g., AIX, Android, Linux, OSX Sun Solaris, Unix, Windows, etc.) and any commercially available or custom software (e.g., browser software, communications software, word processing software, etc.). These systems may include processors, memories (e.g., RAM, cache, flash, ROM, solid-state, hard-disk, etc.), internal or external communications devices (e.g., modem, network adapter, etc.), I/O interfaces, output devices (e.g., displays, printers, etc.), and input devices (e.g., physical keyboard, touch screen, mouse, trackpad, microphone for voice recognition, etc.).

Storage 30, storage 70 and storage 75 may be implemented by any quantity of any type of conventional or other databases (e.g., network, hierarchical, relational, object, etc.) or storage structures (e.g., files, data structures, web-based storage, disk or other storage, etc.), on any conventional or other memory or storage device, and may be volatile (e.g., RAM, cache, flash, etc.), or non-volatile (e.g., ROM, hard-disk, optical storage, etc.), and include any suitable storage capacity.

Shared resources 40 may be any suitable computer-implemented resource suitable for sharing in a multiple member computer system. For example, the shared resources 40 may each be a computer system (e.g., a network, server, or server group), a hardware component (e.g., processors, memory, and storage devices such as hard disk drives or solid state drives), software (e.g., operating systems, applications, databases, web services, etc.), or a combination of both hardware and software components. For example, the shared resources 40 may be a database system or an application server. Or, for example, the shared resources 40 may each be data objects, such as tables, indexes, stored queries, data tiles, log files, control files, and backup files, or data storage resources such as database clusters, tablespaces, memory spaces, or pages, or portions of these, e.g., a portion of a table such as a row (tuple), or a portion of a tablespace such as a page.

Applications 50 are any applications or portions thereof (e.g., a task or thread) that access the shared resources, for example where the shared resources are tables, the applications may be any application that accesses the tables, for example a database application or client such as a DB2 client or part of an IBM Enterprise Content Management system. Storage 70 on the primary node 102 stores lock information used by the Global Lock Manager 60, for example, a lock table comprising the interests of all secondary nodes in that lock, and user data relating to the locks. Storage 75 on the central node 106 stores lock-related information needed by the Global Deadlock Detector 90 to resolve global deadlocks, e.g., lock wait information, lock interests, a global wait graph, etc.

The computer system 100 may include additional servers, clients, and other devices not shown, and individual components of the system may occur either singly or in multiples, for example, there may be more than one primary node 102 in the system. It is understood that any of the various components of the computer system 100 may be local to one another, or may be remote from and in communication with one or more other components via any suitable means, for example a network such as a WAN, a LAN, Internet, Intranet, mobile wireless, etc. Communication between the GLM 60 and the various LLMs 20 is depicted by communications channels 110, and communication between the GDD 90 and the various LDDs 80 is depicted by communications channels 112. Communication between and among the various nodes may be via any standard inter-machine protocol (e.g., TCP/IP, InfiniBand, etc.) if remote, or any standard intra-machine protocol (e.g., shared memory, pipes, etc.) if local.

The computer system comprises a two-level locking system, comprising one or more global lock managers (GLM) 60 and a local lock manager (LLM) 20 for each node of the system. Each LLM handles access to shared resources on a per-application (equivalently, transaction) granularity, and the GLM controls access (locks) to shared resources on a per-member granularity. More than one GLM may be used, because the operation of multiple GLMs allows redundancy of information (for high availability) as well as reducing overhead for each GLM. Not only does this improve scalability, because for n GLMs each have to perform 1/nth of the load, but it also allows the GLM to run on each member as opposed to having to run on a separate machine. The present embodiments also allow multiple states in-flight between the LLMs and the GLM, asynchronous communication between the LLMs and GLM, and lock "pre-fetching", all of which reduce application wait time because asynchronous daemons can perform this work while the applications perform actual user activity.

Deadlocks are also handled in a two-level manner, and the system also comprises a global deadlock detector (GDD) 90, and a local lock detector (LDD) 80 for each node of the system. Each LDD handles local deadlocks among applications on its local node, and the GDD handles global deadlocks among applications on different nodes. While the functionality of the LLM and LDD may be combined into the same device in certain embodiments, in at least some embodiments the GLM and GDD necessarily function independently of each other in order to achieve a desired high performance.

A. Global Lock Management

The two-level lock manager of the present embodiments provides coherency across physical and/or logical nodes 104 (henceforth called "members"). The scheme is called "two-level" because there is a per-member Lock Manager, coiled the Local Lock Manager (or LLM), and a per-instance Lock Manager, called the Global Lock Manager (or GLM). On each member, the LLM grants locks to local applications, and if there is a conflict with another member over a lock, the LLMs coordinate with the GLM, and the GLM resolves the global lock conflict and ensures proper coherency over the whole cluster or computer system (i.e., no conflicting access to the same resource) for any resources that are shared globally. For example, in a shared data environment two or more members may request a resource (lock) already held by another member or members. The process of notifying the latter member(s) that the lock is needed remotely is called a "reclaim." The process of notifying and obtaining the lock for other members to use is called "reclaim processing." In the present embodiment, the GLMs are partitioned much like data is partitioned: lock requests are hashed, for example based on lock name, or lock type, across multiple GLMs. Therefore, for each such hash class, each LLM always communicates with the same GLM.

An arbitrary locking system can be defined in terms of "lock modes" that a resource can be locked with and their relationships, as well as operations such as acquire, upgrade, downgrade, release, and lock. The relationships between lock modes can be described by the following matrices:

compatible[ ][ ]: compatible[mode1][mode2] returns true if mode1 is compatible, i.e., can exist concurrently, with mode2.

dominates[ ][ ]: dominates [mode1][mode2] returns true if mode2 is at least as compatible as mode1.

LUB[ ][ ]: LUB[mode1][mode2] is the least upper bound ("LUB"or "supremum") of mode1 and mode2, that is, the mode which contains mode1 and mode2 in its compatible set, but as few extraneous modes as possible. LUB[mode1][mode2] is also called 'group mode'.

GLB[ ]: GLB[mode1][mode2] is the greatest lower bound ("GLB" or "infimum") of mode1 and mode2.

As an example, some typical 'lock modes' could be: NON, Share, eXclusive, INtent, Universal). A set of exemplary matrices follows:

A sample compatibility matrix

|     | NON | ..S | ..X | .IN | ..U |
|-----|-----|-----|-----|-----|-----|
| NON | T   | T   | T   | T   | T   |
| ..S | T   | T   | F   | T   | T   |
| ..X | T   | F   | F   | T   | F   |
| .IN | T   | T   | T   | T   | T   |
| ..U | T   | T   | F   | T   | F   |

The corresponding dominates matrix

|     | NON | ..S | ..X | .IN | ..U |
|-----|-----|-----|-----|-----|-----|
| NON | T   | F   | F   | F   | F   |
| ..S | T   | T   | F   | T   | F   |
| ..X | T   | T   | T   | T   | T   |
| .IN | T   | F   | F   | T   | F   |
| ..U | T   | T   | F   | T   | T   |

The resulting LUB (supremum) matrix

|     | NON | ..S | ..X | .IN | ..U |
|-----|-----|-----|-----|-----|-----|
| NON | NON | ..S | ..X | .IN | ..U |
| ..S | ..S | ..S | ..X | ..S | ..U |
| ..X | ..X | ..X | ..X | ..X | ..X |
| .IN | .IN | ..S | ..X | .IN | ..U |
| ..U | ..U | ..U | ..X | ..U | ..X |

The resulting GLB (infimum) matrix

|     | NON | ..S | ..X | .IN | ..U |
|-----|-----|-----|-----|-----|-----|
| NON | NON | NON | NON | NON | NON |
| ..S | NON | ..S | ..S | .IN | ..S |
| ..X | NON | ..S | ..X | .IN | ..U |
| .IN | NON | .IN | .IN | .IN | .IN |
| ..U | NON | ..S | ..U | .IN | ..U |

In addition to "lock modes", the present embodiments provide for storing user data with each lock. User data is an arbitrary chunk of data, which is stored per application on the LLM (e.g., in storage 30) and per member on the GLM (e.g., in a lock table in storage 70). Because of this restriction, user data must consist of an entity which can be amalgamated (for example, a bit field, or a pointer for an exclusive lock, where it is ensured that there is only one such lock held per member at a time).

Conventional lock managers are request driven: an application or a member makes a request to acquire/upgrade/downgrade/release a shared resource in some mode. The complete state of the system is a sum total of all the requests and grants in-flight, and furthermore, strict ordering must be observed. I.e., if an application (1) requests a lock X and then (2) releases it, it's imperative that the order of operations be (1) followed by (2). Because of this feature, request-based systems are inherently serial. Furthermore, each request must be fully processed to properly reflect the state of the system.

In contrast, the present embodiments are state-based, and thus avoid the limitations of serial processing and processing each request that are required by conventional systems. In the present embodiments, each communication between the LLMs and the GLM(s) is a complete, bounded (fixed-sized) lock state, called the Abstract Lock State (ALS). Each ALS describes the complete state of the system, thus allowing parallelized communication instead of serial, and avoiding the need to process each request, which are the two main weaknesses of a request-based system. Generally, the "state of a lock" includes the "group mode" (the LUB of all held modes); any user data held; and all holders and waiters of the lock. States are denoted by [ ] brackets in this document. The state paradigm cuts down communication costs because multiple applications are expressed in a single communication (request).

The state of the Local Lock Manager is the set of lists of all applications on all members waiting for or holding locks. Each list is FIFO ordered on each LLM to prevent starvation, and is a priority queue to give more flexibility. Note that it is not trivial to order all the lists' waiters, because they could have come into the system at the same time and their ordering is not clear. However, whenever the top contender from each LLM makes a request to the GLM, the requests can be ordered on the GLM. Therefore, we obtain an ordering of the top contending waiters across all LLMs. The state as described is obviously complete, but not practical to work with because it scales linearly with the number of applications (and therefore also number of LLMs). In particular, each LLM's list could never be exchanged with the GLM because of its linear growth with the number of applications because it would become a communication bottleneck. The present embodiments thus utilize a new kind of fixed-sized slate which nevertheless is a complete-enough representation of the system. Each LLM still contains a full applications list. This application list is then represented per lock as an Abstract Lock State, called the local lock state or LLM-ALS.

Each LLM-ALS comprises a number of fields, for example the exemplary fields shown below, which are discussed in further detail below with reference to the Figures:
- sequence_number—an incremental number assigned to each LLM-ALS;
- sub_sequence_number—an incremental number assigned to each response to a request;
- Holdable—the group mode, e.g., the least upper bound (LUB) of all held applications;
- Confirmed Holdable—the most recent value of Holdable received from the GLM;
- Grantable—grantable mode used for reclaim;
- Fair—the mode of the top contending waiter(s);
- Fair_flags—flags used to invoke special handling;
- Fair_priority—priority of Fair;
- Concurrent—an extended Fair that allows several applications to run concurrently;
- Maximum—the LUB of all holders and waiters; and
- User_Data—user data that needs to be stored for granted modes, for example it may comprise:
  - Holdable_user_data—user data that needs to be stored for the current group mode;
  - Fair_user_data—user data that needs to be stored if Fair is granted;
  - Concurrent_user_data—user data that needs to be stored if Concurrent is granted; and
  - Maximum_user_data—user data that needs to be stored if Maximum is granted.

The GLM receives the LLM-ALSs from the individual LLMs, and for each lock, stores the received LLM-ALSs in a priority queue, sorted by the "Fair_priority" LLM-ALS field. The GLM may store all of these priority queues (one for each lock) in a lock table stored in storage 70, for example. The lock table may comprise, for each lock known to the GLM, the interests of all members in that lock, ordered in a priority queue. When a new LLM-ALS comes in for a particular lock, the GLM attempts to grant the requested lock if there are no conflicts, but if there are conflicts, the request is queued for processing in the respective priority queue, in FIFO order. Regardless, the GLM sends the following response back to the LLM, which is again an amalgamated fixed-size state, called the global lock state or GLM-ALS:
- sequence_number—the number of the LLM-ALS to which the GLM-ALS is responding;
- sub_sequence_number—an incremental number assigned to each response to a request;
- Holdable—holdable mode granted to this lock;
- Grantable—grantable mode used for reclaim;
- Output_flags—flags used to notify the LLM of any special conditions;
- Blocked_client_priority—the highest priority of a remote client this member is blocking; and
- Output_user_data—user data of holders, e.g., the sum total of all holders' user data.

The present embodiments involve sending multiple states between the LLM and GLM and parallelizing the lock process. By construction of the LLM-ALS, Concurrent fields are a subset of Maximum, while Fair fields are a subset of Concurrent and therefore Maximum. Therefore, any new grant for a given LLM-ALS is necessarily a more complete operation. Also by construction, any subsequently generated LLM-ALS is complete on its own. By amalgamating the state of the LLM into one LLM-ALS, the present embodiments create a many-to-one mapping, that is, one LLM-ALS can represent multiple situations. As an example, the state [H=NON F=S C=S MAX=S] can represent any of these situations:

| Member 1 | Member 1 | Member 1 |
| --- | --- | --- |
| app1 wants S | app1 wants S | app1 wants S |
|  | app2 wants S | app2 wants IN |

This many-to-one mapping is very desirable because it allows the system to detect "true" system changes easily. For instance:
Member 1
app1 wants S
will generate and send a state [H=NON F=S C=S MAX=S]. Assume the response to this state has not yet arrived. If app2 now comes in and asks for S, the system does not generate a new state: app2 can simply wait for app1's response to return to know whether S was granted or not. If app3 now comes in and asks for IN, again, no new state needs to be generated. In general, if a new requester ask for a mode dominated by Fair, no communication is necessary. Accordingly, the present embodiments provide benefits including an ordered communication system, no communication of redundant data, avoiding of unnecessary releases, solving the total release problem, and making use of responses that are not the most recent.

In the present embodiments, the LLMs allow lock owners to "stick" to on unused lock in anticipation of future use. These "sticky locks" avoid unnecessary release and re-grant (and the associated network and CPU overhead). When such a lock is reclaimed by the GLM, the LLM employs a negotiation scheme to release the lock, by repeatedly negotiating with the lock holder until the lock is released. Negotiation overhead is avoided by passing the lock reclaim information to the holder through a "handshake" that guarantees the lock's release.

1. The Local Lock Manager (LLM)

Figure 2:
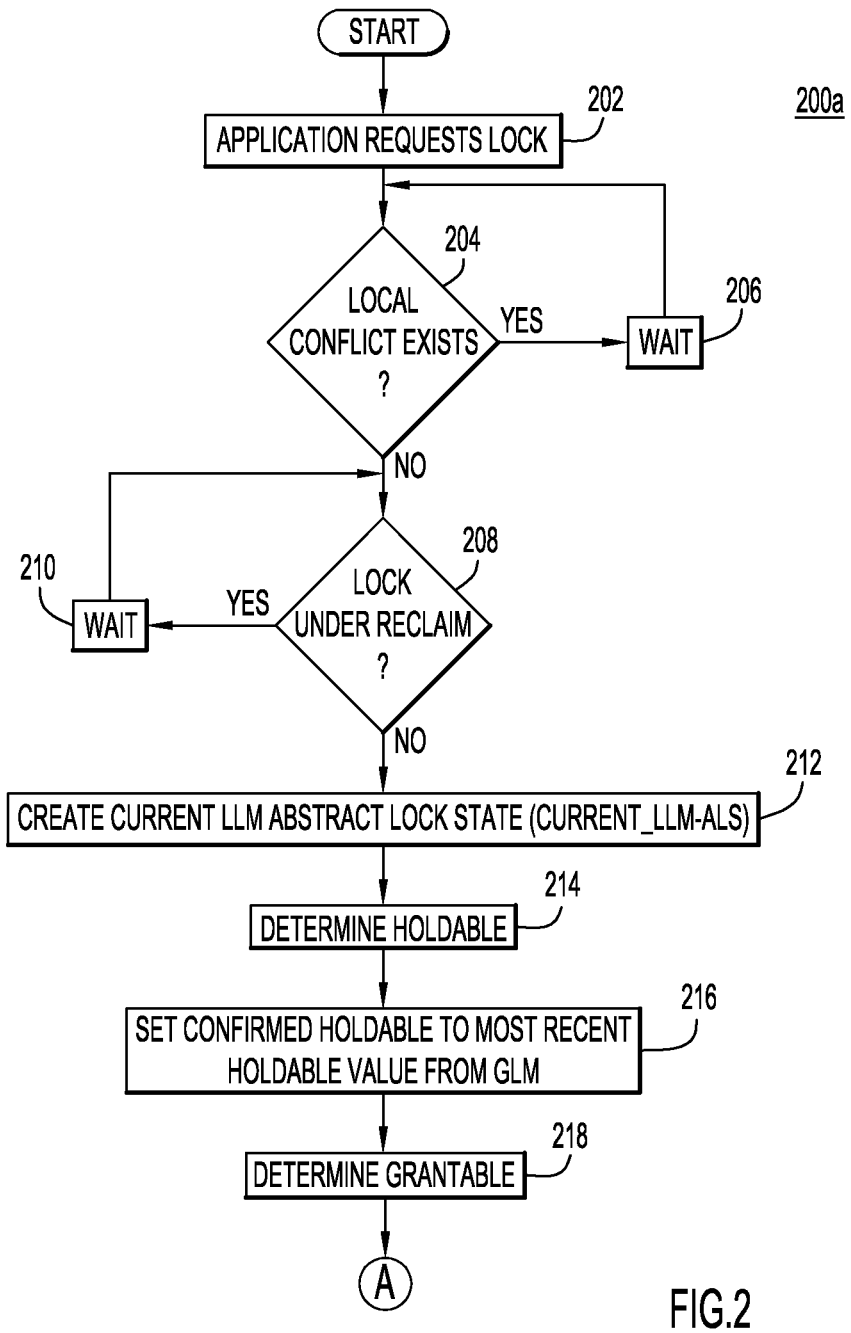
FIGS. 2, 3 and 4 are flowcharts depicting an exemplary method of a local lock manager generating a Local Lock Manager Abstract Lock State (LLM-ALS), according to an embodiment of the present invention.
Figure 3:
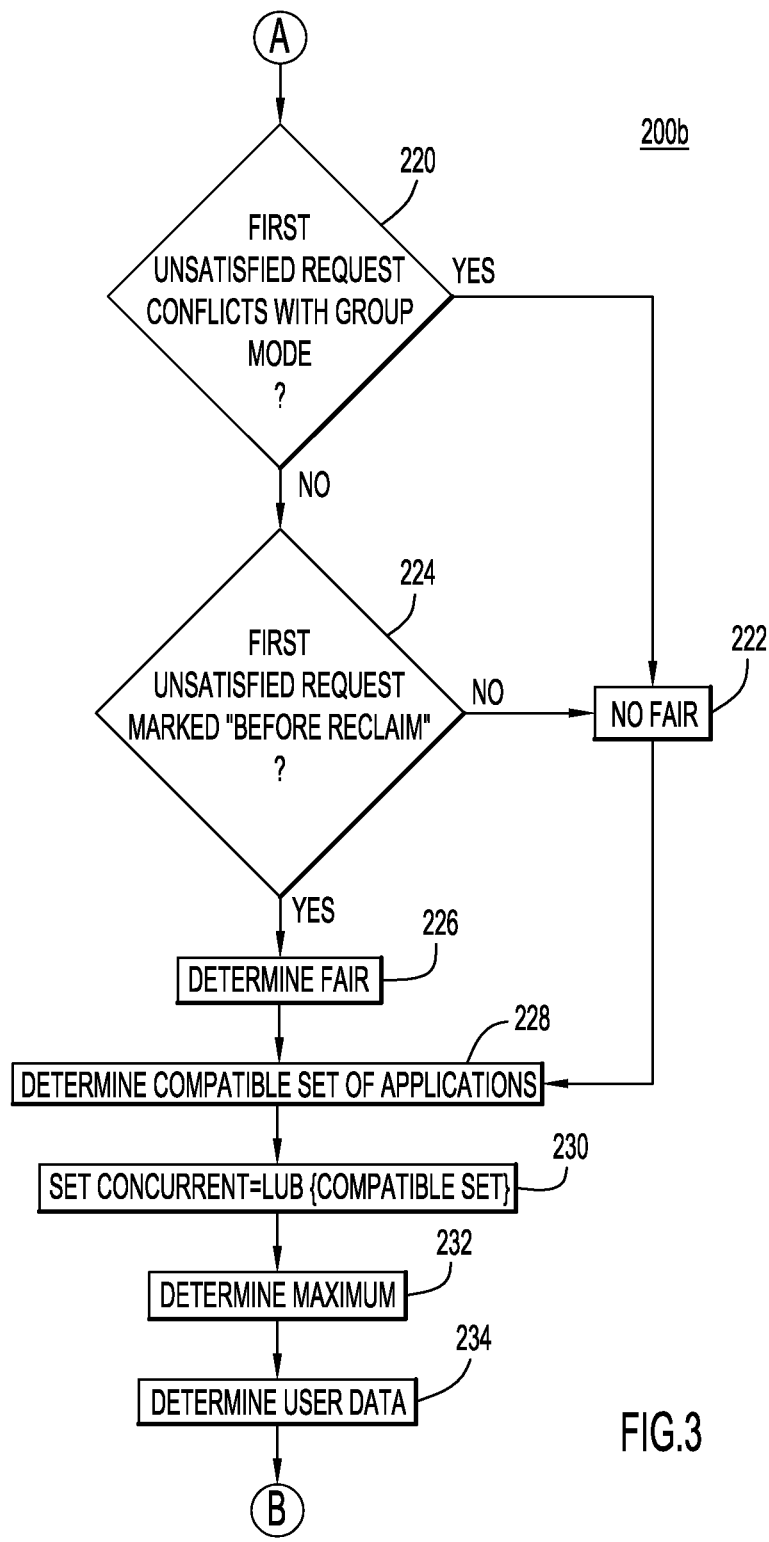
Figure 4:
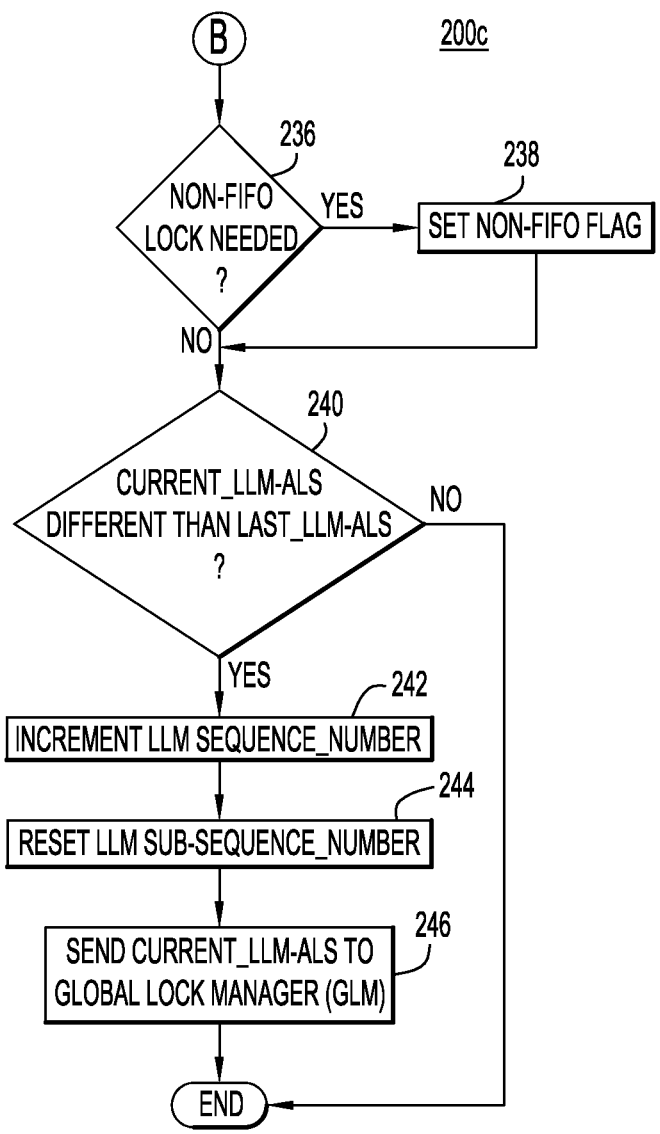

Referring now to FIGS. 2, 3 and 4, reference numerals 200a, 200b, and 200c generally designate flow charts depicting an exemplary method of a local lock manager processing lock requests and generating an LLM-ALS, according to an embodiment at the invention, in step 202, the local lock manager (LLM) receives a request for a lock from an application, and in step 204 determines if there is a local conflict with the request. If yes, then in step 206 the LLM waits until the local conflict is resolved, and then returns to step 204. It not, then in step 208 the LLM determines if the lock is under reclaim. A reclaim occurs when a lock is re-acquired from a remote member or members. If yes, then in step 210 the LLM, waits until the lock has been reclaimed and then returns to step 208. If not, then in step 212 the LLM creates a current Abstract Lock Stale (ALS), also called the Current_LLM-ALS.

Steps 204 through 210 improve concurrency and help avoid lock "ping-ponging" by not generating any new LLM-ALSs when there is a local conflict or a lock is under reclaim. Waiting until these situations have resolved before expressing additional interest in a lock to the GLM improves performance. Lock ping-ponging refers to a situation where a lock is contended for by multiple applications on two or more members. After granting the lock to just one application from a member, the lock manager stops granting to the other applications from this member and grants to one application from another member. This results in a granting order such that only one application from a member is granted at a time, and the lock moves back and forth (ping-ponging) between the members, which is very inefficient because of the communication cost each "ping-pong" incurs.

A strictly fair (FIFO) granting policy can lead to lock ping-ponging. Consider the following example:

| member M1 | member M2 |
|---|---|
| app1 wants lock 1 in X | app2 wants look 1 in X |
| app3 wants lock 1 in X | app4 wants lock 1 in X |
| app5 wants lock 1 in X | app6 wants lock 1 in X |
| . . . | . . . |

These lock requests might be issued in the following order: app1 app2, app3, app4, . . . , so a simple FIFO policy would produce this sequence of events:
  member M1 holds the lock in X mode, app1 is granted
  member M2 requests X, GLM sends reclaim to member 1
  app1 releases, M1 releases due to reclaim
  GLM grants to M2 (with reclaim information), app2 is granted
  app2 releases, M2 releases due to reclaim
  GLM grants to M1 (with reclaim information), app3 is granted
  app3 releases, M1 releases due to reclaim
  GLM grants to M2 (with reclaim information), app4 is granted
  app4 releases, M2 releases due to reclaim
  GLM grants to M1 (with reclaim information), app5 is granted
  . . .
I.e., the lock is being ping-ponged between M1 and M2. Note that each reclaim and ping-pang are inter-machine trips. Therefore, above, for each app granted, we perform off-machine communication twice.

The present embodiments reduce lock ping-ponging using a new concept called a reclaim line. The reclaim line is drawn when a member first learns about a reclaim. Existing requests on the LLM at that time are considered before the line (or before reclaim), new requests received after are considered after the line (or after reclaim). In the above example, when M1 first learned about the reclaim, requests from app2, app4,app6 are already received, so they are considered as before reclaim. LLM can grant to these applications, before releasing the lock to GLM. Similarly, by the time GLM grants the lock to M2, requests from app3, app5 are already received. M1 will only release the lock after app3 and app5 release the lock. The improved sequence of events is:
  M1 holds the lock in X mode, app1 is granted
  M2 requests X, GLM sends reclaim to M1
  —M1 establishes the reclaim line, app3, app5 are before reclaim
  app1 releases, M1 grants to app3
  app3 releases, M1 grants to app5
  (during this time, app11, app13: app15 on M1 request X, they are after reclaim)
  app5 releases, M1 releases due to reclaim
  GLM grants to M2 (with reclaim information),
  —M2 establishes the reclaim line, app2 is granted and app4, app6 are before reclaim
  app2 releases, M1 grants to app4
  app4 releases, M1 grants to app6
  (during this time, app12, app14, app16 on M2 request X, they are after reclaim)
  app6 releases, M2 releases due to reclaim
  GLM grants to M1
  M1 grants to app11, app13, app15, before returning the lock to GLM
  M2 grants to app12, app13, app16, before returning the lock to GLM
  . . .
  app3 releases, M1 releases due to reclaim
  GLM grants to M2 (with reclaim information), app4 is granted
  app4 releases, M2 releases due to reclaim
  GLM grants to M1 (with reclaim information), app5 is granted
  . . .

Steps 214 through 246 describe the generation of the Current_LLM-ALS. In step 214 the LLM determines the value for the "Holdable" field, which is equal to "group mode." The Holdable value can only be increased by the GLM, and can only be reduced by an LLM. The LLM reduces the Holdable value as a response an application releasing a lock, committing, or as a response to a reclaim.

In step 216, the LLM sets the value of "Confirmed Holdable." to the most recent value of Holdable received from the GLM, and in step 218, the LLM determines the value of "Grantable." In steps 220 through 226, the LLM determines "Fair", which is a mode allowing at least one additional application to run on the LLM. Typically Fair is the first (in FIFO order) unsatisfied request but there are exceptions if the first unsatisfied request conflicts with group mode or in a reclaim situation. In step 220 the LLM determines if the first unsatisfied request conflicts with group mode, in which case there is no fair. A conflict may occur, for example, in the following scenario:
  M1: app1 granted S
  M1: app2 granted S
  M1: app3 waiting X
Fair on LLM M1 will not become X, and the LLM determines in step 222 that there is no fair and then proceeds to step 228. If there is no conflict, then the LLM in step 224 determines if the first unsatisfied request is marked "before reclaim" and the LLM is in a reclaim situation. For example, consider the following scenario:

M1: app1 granted S
M2: app2 wants X; reclaim sent to M1
M1: app3 wants U; is NOT marked 'before reclaim'

Fair on LLM M1 will not become U, and the LLM determines in step 222 that there is no fair and then proceeds to step 228. If the request is marked "before reclaim", or if the LLM is not under reclaim, then the LLM in step 226 determines Fair to be the first unsatisfied request.

In steps 228 and 230, the LLM determines "Concurrent", which is a mode that when granted gives highest concurrency to the LLM and does not skip any unsatisfied applications. For example:

M1: app wants X
M1: app2 wants S
M1: app3 wants S
M1: app4 wants S

Fair=X, and although if would seem that Concurrent should be S, that would lead to starvation of app1. The LLM determines Concurrent by first in step 228 determining a compatible set of applications, i.e., a contiguous set of applications, following FIFO order, all of which are compatible with each other. For granted applications, the granted mode is used to compute the set, for waiters, the requested mode is used, and for converters, either is used. For example, for the preceding scenario, the compatible set is {X}. In step 230, the LLM sets Concurrent to be the Least Upper Bound (LUB) of the compatible set, for example for the preceding scenario. Concurrent=X, the LLM then proceeds to step 232.

The determination of the compatible set and Concurrent is illustrated by additional exemplary scenarios:

Scenario 1:

| | |
|---|---|
| M1: app1 wants S | The compatible set is {S, IN, U} |
| M1: app2 wants IN | Concurrent = U |
| M1: app3 wants U | |
| M1: app4 wants X | |

Scenario 2:

| | |
|---|---|
| M1: app1 wants S | The compatible set is {S, IN} |
| M1: app2 wants IN | Concurrent = S |
| M1: app3 wants X | |
| M1: app4 wants U | |

Scenario 3:

| | |
|---|---|
| M1: app1 converts from IN to S | The compatible set is {S, U} |
| M1: app2 converts from IN to X | Concurrent = U |
| M1: app3 converts from IN to U | |

Scenario 4:

| | |
|---|---|
| M1: app1 converts from IN to S | The compatible set is {S} |
| M1: app2 converts from IN to X | Concurrent = S |
| M1: app3 wants U | |

In step 232, the LLM determines "Maximum", which is the LUB (supremum) of all the held and wanted modes. It can be useful when there is no contention on a particular lock, because the GLM can grant Maximum and no other trips to the GLM will then be necessary, as in the following scenario, where Maximum=X which eventually allows all apps to run:

M1: app wants IN
M1: app2 wants S
M1: app3 wants X

In step 234, the LLM determines the "User_Data" for the LLM-ALS. Fair, Concurrent and Maximum at have user data fields associated with them, When a particular mode (Fair, Concurrent or Maximum) is granted, the GLM with remember the corresponding user data. Typically, one would want the fields to be an aggregate, that is, Maximum_User_Data is an aggregate of the Concurrent_User_Data and Maximum_User_Data fields, and Concurrent_User_Data is an aggregate of the Concurrent_User_Data and Fair_User_Data fields. A simple example would be a bit field, which is termed "attribute" in the following scenarios. For example:

M1: app1 wants S, attribute 0×1
M1: app2 wants IN
M1: app3 wants U, attribute 0×2

The resulting computation of User_Data is: Fair=S, Fair Attributes=0×1, Concurrent=U, Concurrent Attributes=0×3. Note that the Fair attributes with actually be the set of anyone granted, or considered for grant, as in the following scenario:

M1: app1 granted S, attribute 0×1
M1: app2 granted S
M1: app3 granted U, attribute 0×2
M1: app4 wants S, attribute 0×4

Here, Fair LRB=app4, and Fair Attributes=0×1|0×2|0×4=0×7. The "Fair LRB" refers to the lock request block (LRB) that was selected as Fair. Concurrent attributes are similar, except that it is now o set of all granted applications' attributes, Fair Attributes and the compatible set's attributes, as illustrated by the following:

M1: app1 granted X
M1: app2 wants S
M1: app3 wants S, attribute 0×2
M1: app4 wants IN, attribute 0×1
M1: app5 wants U, attribute 0×4
M1: app6 wants X, attribute 0×8

When app1 releases, the LLM determines that Fair LRB=app2, but Fair Attributes=0×2. The compatible set is {S, IN, U}, therefore Concurrent Attributes are 0×2 |0×1|0×4)=0×7. Maximum Attributes=(0×2|0×1|0×4|0×8)=0×F. For any ALS, the set of concurrent attributes includes the set of Fair attributes, and the set of Fair attributes includes the set of Held attributes. Thus, the modes Maximum, Concurrent, Fair and Holdable may be considered subsets of each other in certain respects.

As another example of "User_Data", we describe a "Retained Bit", which is a single bit field that can be used for the purpose of member crash recovery. For example, some locks were only taken for read operations, and therefore it does not make sense to hold them throughout member recovery which could be a lengthy process. However, some locks were taken for write operations, and these locks need to be held until the corresponding applications have recovered (committed or rolled back). A retained lock is a lock which the GLM will hold (retain) throughout member recovery and crash. Otherwise, the lock will be released. Each of the Fair, Concurrent and Maximum modes have a "retained" bit associated with them: retained bits then undergo the same accumulation as described above. This is illustrated, e.g.:

M1: app1 wants S
M1: app2 wants S, write lock
M1: app3 wants U

This scenario results in [Fair=S, Fair Retained bit ON, Concurrent=U, Concurrent Retained bit ON, Maximum=U, Maximum Retained bit ON]. Note in this scenario that the lock will become retained on the GLM even though app1 did not specify it to be. The alternative would be for app2 to not become granted and wait for app1 to release before the lock becomes retained, but this would seriously impact concurrency, hence in this approach an application may benefit from a lock being retained even if it did not require it to be. In another example:

M1: app1 wants S
M1: app2 wants U, write lock
M1: app3 wants X

This scenario results in [Fair=S, Concurrent=U, Concurrent Retained bit ON, Maximum=X, Maximum Retained bit ON]. For any ALS, Maximum must be retained if Concurrent is retained, Concurrent must be retained if Fair is retained, and Fair must be retained if Holdable is retained.

"User_Data" may also include priority information. For example, the LLM determines the priority ("Fair_Priority") of the ALS, which is the Fair LRBs' priority that is determined by its application, e.g., through workload steering or another scheme. The priority field is the highest priority of all the LRBs considered as fair.

In step 236, the LLM determines if a non-FIFO lock is needed, for example an upgrade that requires special handling at the GLM to avoid FIFO ordering. It yes, then in step 238 the LLM sets the "Non-FIFO" flag and then proceeds to step 240. If not, the LLM proceeds to step 240. In step 240, the LLM determines if the newly generated ALS (the Current_LLM-ALS) is different from the most recent ALS (the Last_LLM-ALS) that this LLM sent to the GLM, because if it is not different (i.e., the state of the LLM has not changed), then it is unnecessary to send a new ALS. If it is not different, then the LLM discards the newly generated ALS and ends process 200. It the new ALS is different, then in step 242 the LLM increments the value of the "Sequence_Number" field, for example by incrementing the signed integer value from the Last_LLM-ALS, and in step 244 resets the value of the "Sub_Sequence_Number" field to a starting integer value (e.g., zero). Then, in step 246, the LLM sends the Current_LLM-ALS to the Global Lock Manager (GLM) and process 200 ends.

Figure 5:
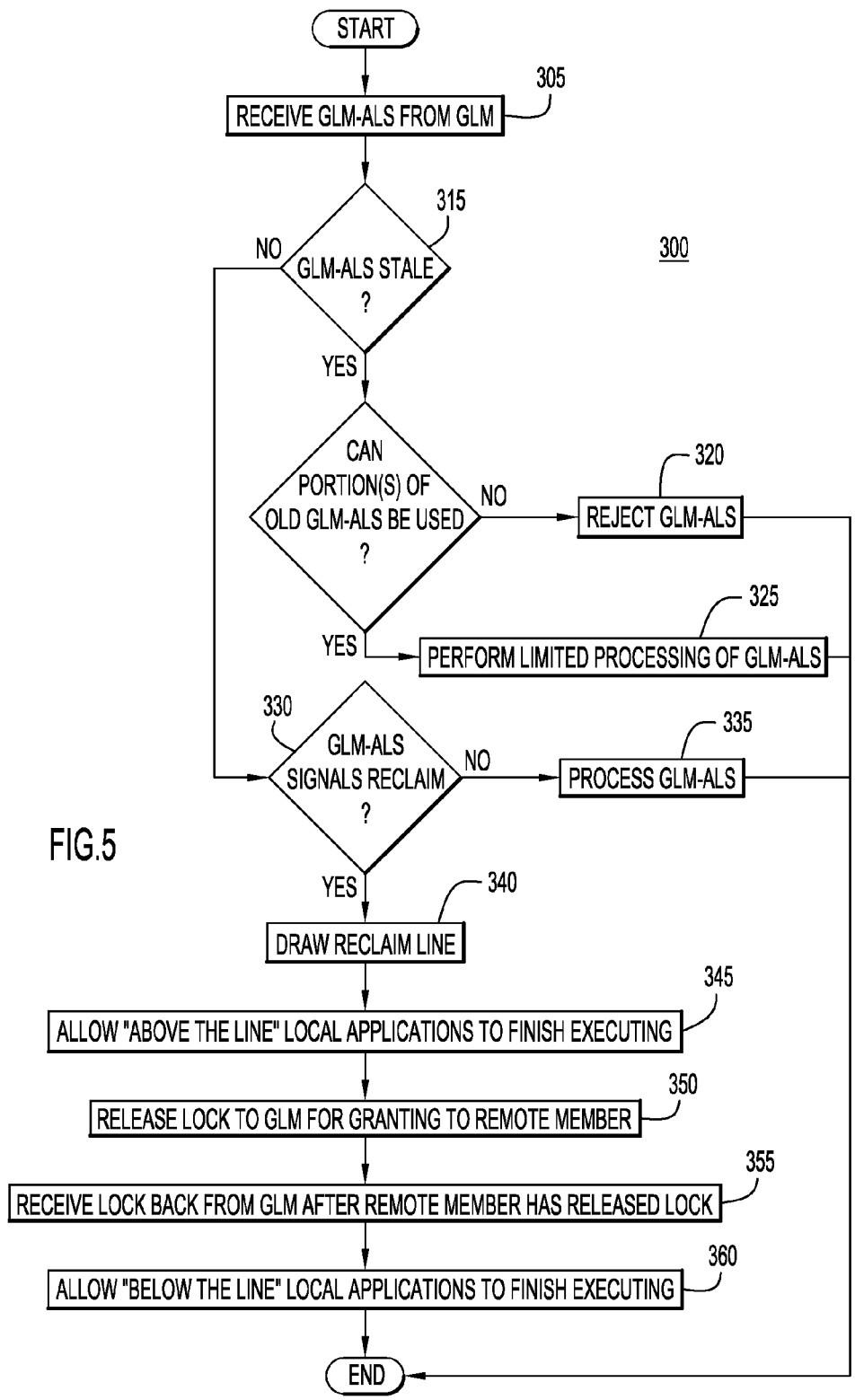
FIG. 5 is a flowchart depicting an exemplary method of a local lock manager processing a Global Lock Manager Abstract Lock State (GLM-ALS), according to an embodiment of the invention.

Referring now to FIG. 5, reference numeral 300 generally designates a flow chart depicting an exemplary method of a local lock manager processing a global lock manager abstract lock state (GLM-ALS) received from a GLM, according to an embodiment of the invention. In step 305, the local lock manager (LLM) receives an Abstract Lock State from the Global Lock Manager (a GLM-ALS), either in response to an LLM-ALS that was previously sent, or as a notification GLM-ALS. A notification is an asynchronous channel especially designed for this purpose: a member X may be busy running an application, which has blocked a remote member Y clue to a lock conflict. When this is detected the GLM sends a notification reclaim to the LLM on Member X. Because Member X is busy it may not be able to process the reclaim, instead an asynchronous thread will process the notification and act on it. Because the thread is decoupled from regular transaction processing it is guaranteed that it can always process the reclaim and allow the cluster to proceed. Note that processing a reclaim does not necessarily mean releasing the lock, because an application on Member X may still be accessing data protected by this lock. In this case, processing the reclaim could simply mean that the LLM on Member X has updated its local lock state to reflect the new conflicting lock request from another member.

In step 310 the LLM determines if the GLM-ALS is still valid, e.g., if the GLM-ALS is stale or outdated. If the received GLM-ALS is stale, then the LLM proceeds to step 315 and determines whether any portion or portions of the GLM-ALS may be used, if not, resects the GLM-ALS in step 320 and then ends process 300, and if yes, performs limited processing of the usable portions of the GLM-ALS in step 325 and then ends process 300. If the GLM is not stale, then the LLM proceeds to step 330.

Step 310 helps avoid confusion that may arise because multiple lock states (LLM-ALSs and GLM-ALSs) may be in-flight at a time, and the lock states may be received in any order. Consider the following scenario where there may be multiple local lock states in-flight at the same time:

Member 1
app1 holds S
app1 changes user_data [seq=2 H=S F=C=MAX=S]
app1 changes user_data [seq=3 H=S F=C=MAX=S]

Even if the GLM processes seq=2 and seq=3 in-order, the GLM's responses may arrive in a different order at the LLM, such that the LLM processes the response with seq=3 first. As such, when the LLM later attempts to process the response with sec=2, it will be rejected as stale.

Similarly, the LLM may receive an ALS from the GLM that is not recent, and because of the mixing of upgrades and releases and the number of states in flight, it is not dear whether the GLM-ALS can be used. For example, consider the following scenario:

Member 1
app1 holds S [H=S]
app1 releases down to IN [seq=1 CH=S H=IN F=IN]
app1 upgrades to S [seq=2 CH=S H=IN F=S]
app1 releases the lock [seq-=3 CH=S H=NON F=NON]
app2 wants IN [seq=4 H=NON F=IN]

If the seq=2 response arrives [seq=2 ss=1 CH=S H=S G=S] before the seq=3 and seq=4 responses, is it safe for app2 to use it? In this scenario, the answer is no, because seq=3 may be processed by the GLM and is going to release the lock. In general, the LLM can use the minimum of the modes that are still in flight to the GLM and come later in the sequence (because the GLM could always process such a request and release the lock). In addition, the Confirmed Holdable field allows older states to be used, due to the fact that later releases will be ignored because of it.

The present embodiments solve this problem, by preventing earlier slates from being processed once a later state has been processed, so that the system does not "go back in time." In order to prevent earlier states from being processed, each ALS may be numbered sequentially, for example, the LLM Abstract Lock States may be numbered in the "Sequence_Number" field, using, e.g., a signed integer. For each LLM-ALS there can be multiple responses (grants) from the GLM, so each GLM Abstract Lock Slate contains a "Sequence_Number" field indicating the LLM-ALS to which it is responding, and a "Sub_Sequence_Number" field by which the GLM Abstract Lock States are numbered using, e.g., a signed integer. Whenever a new ALS is generated, the appropriate sequence and subsequence numbers are set. The LLM may then compare the "Sequence_Number" and "Sub_Sequence_Number" fields of the received GLM-ALS to the "Sequence_Number" and "Sub_Sequence_Number" fields of the last GLM-ALS that was processed, in order to determine which was more recent. For example, when signed integers are used the LLM may simply subtract the Sequence_Number value of the last processed GLM-ALS ("seq 1") from the Sequence_Number value of the received GLM-ALS ("seq 2"), and test whether the result is greater than zero. If the result is less than zero, then the received GLM-ALS is older than the last-processed GLM-ALS, and if the result is greater than zero, then that means seq2 is more recent than seq1, even in the case where seq2 has wrapped from a very large positive value to a very large negative value. If the result is zero, then the LLM may compare the Sub_Sequence_Number fields of the received and last processed GLM-ALS to determine which is more recent, in a similar fashion as for the Sequence_Number fields. The Sequence_Number and Sub_Sequence_Number field values for the last processed GLM-ALS may be stored in the LLM, for example in a place that is not freed when a lock's metadata is freed, such as a locking hash table.

As will be discussed in more detail later, the GLM also evaluates received LLM-ALSs to determine whether they are stale in a similar fashion. Thus, it is understood that the GLM does not necessarily respond to every LLM-ALS that is sent, because some LLM-ALSs will be determined to be stale and will be discarded instead of being processed.

In step 330, the LLM determines if the GLM-ALS signals a reclaim, e.g., by determining whether the value of the "Grantable" field of the GLM-ALS is not equal to the value of the "Holdable" field. The value of "Grantable" is the highest mode that can be held on the local member so that it does not block a remote member waiting for a resource. If a reclaim is not signaled, then the LLM proceeds to step 335 and processes the GLM-ALS, thus, for example, receiving the requested lock, and then the process 300 ends. If a reclaim is signaled, then the LLM proceeds to handle the reclaim in steps 340 through 360.

When a reclaim is received, the lock is released so that the remote waiter may make progress, in order to reduce starvation. The present embodiments are designed to reduce lock "ping-ponging", which occurs when two or more members repeatedly reclaim a lock from each other, and which is very expensive because each reclaim involves at least one inter-member communications exchange. For example, consider the following scenario:

| Member 1: | Member 2: |
|---|---|
| app1 holds X | app11 wants X |
| app2 wants X | app12 wants X |
| app3 wants X | app13 wants X |

If Member 1 and Member 2 were to release their locks immediately upon notice of a reclaim, then in this scenario the lock would "ping-pong" because at least six inter-member communications would be required. A naïve solution would be to hold the lock on Member 1 until all holders and waiters on Member 1 are serviced, and then to release the lock to a remote member where the process is repeated, thus ensuring that remote members are not starved and reducing the number of inter-member communications to one. However, the naïve solution can cause Member 2 to be starved by additional applications (e.g., app4, app5, . . . appN) arriving on Member 1 and being served prior to releasing the lock to Member 2. Also, in certain scenarios the naïve solution may result in confusion about who should release the lock, for example in this second scenario:

| Member 1: | Member 2: |
|---|---|
| app1 holds X | app11 holds IN |
| app2 wants Z | app12 wants X |
| app3 wants S | app13 wants X |

In the second scenario, if app12 arrives before app2, app12 will reclaim the lock from Member 1. On Member 1, a line is drawn to include {app1, app2, app3} and the lock continues to be held in X. When app1 releases, app2 cannot be granted because it wants a higher mode, Z. Therefore, the lock is now reclaimed from Member 2. At this point it is not clear who, if anyone should yield the lock.

The present embodiments reduce lock ping-ponging and starvation risks while also removing confusion about lock yielding by utilizing a conceptual "reclaim line" that is drawn when a reclaim arrives on a member and which includes all holders and waiters on the member that are dominated by the currently held mode. The lock will be held until all applications in the line are serviced, and then the lock is released and the process repeats on the remote member(s). In the second scenario above, this results in the "reclaim line" being drawn at {app1}, which is dominated by the currently held mode. Once app1 has finished executing, the lock is released to Member 2, where a reclaim line is drawn at {app11, app12, app13} when the reclaim from app2 arrives. App11, app12 and app13 then finish executing and Member 2 releases the lock to Member 1 so that app2 and app3 may finish executing. This solution has required only two reclaims and has minimized inter-member communication without risking starvation or confusion.

Thus, as shown in FIG. 5, when a reclaim arrives at the LLM, the LLM draws a reclaim line in step 340 to include all holders and waiters on LLM that are dominated by the currently held mode, which are considered to be "above the line" applications. In step 345 the LLM allows the "above the line" applications to finish executing, and then in step 350 releases the lock to the GLM so that it can be granted to the remote member requesting the reclaim. The process then repeats on the remote member. In step 355, the LLM receives the lock after the remote member has used and released the lock to the GLM and it is re-granted back to the LLM, and in step 360 the LLM allows any "below the line" applications that have subsequently requested the lock to finish executing. The process then ends.

The present embodiments thus favor concurrency while being starvation-free. Any Lock Manager should ideally be starvation free. That is, an application should always be able to obtain a lock after some finite amount of time. Present embodiments generally ensure this by serving out requests in FIFO order, both on the LLM and on the GLM. Because the GLM utilizes priority queues it is, of course, theoretically possible that a low priority request is starved by a never ending stream of high priority requests. In practice, however, the users of high priority requests are infrequent events and, therefore, the starvation rule is not violated. The present embodiments also allow for a non-FIFO ordering of states on the GLM, which can theoretically lead to starvation. In practice, however, this would be limited to, e.g., upgrading applications, a particular time limit, or a certain number of requests. Because at any point in time there is a finite number of such applications, they are guaranteed to complete and thus again cause no starvation. The present embodiments exhibit improved concurrency over a simple FIFO because of the enhancements just mentioned. Additionally, avoiding ping-ponging helps avoid off-machine communications.

2. The Global Lock Manager (GLM)

Figure 6:
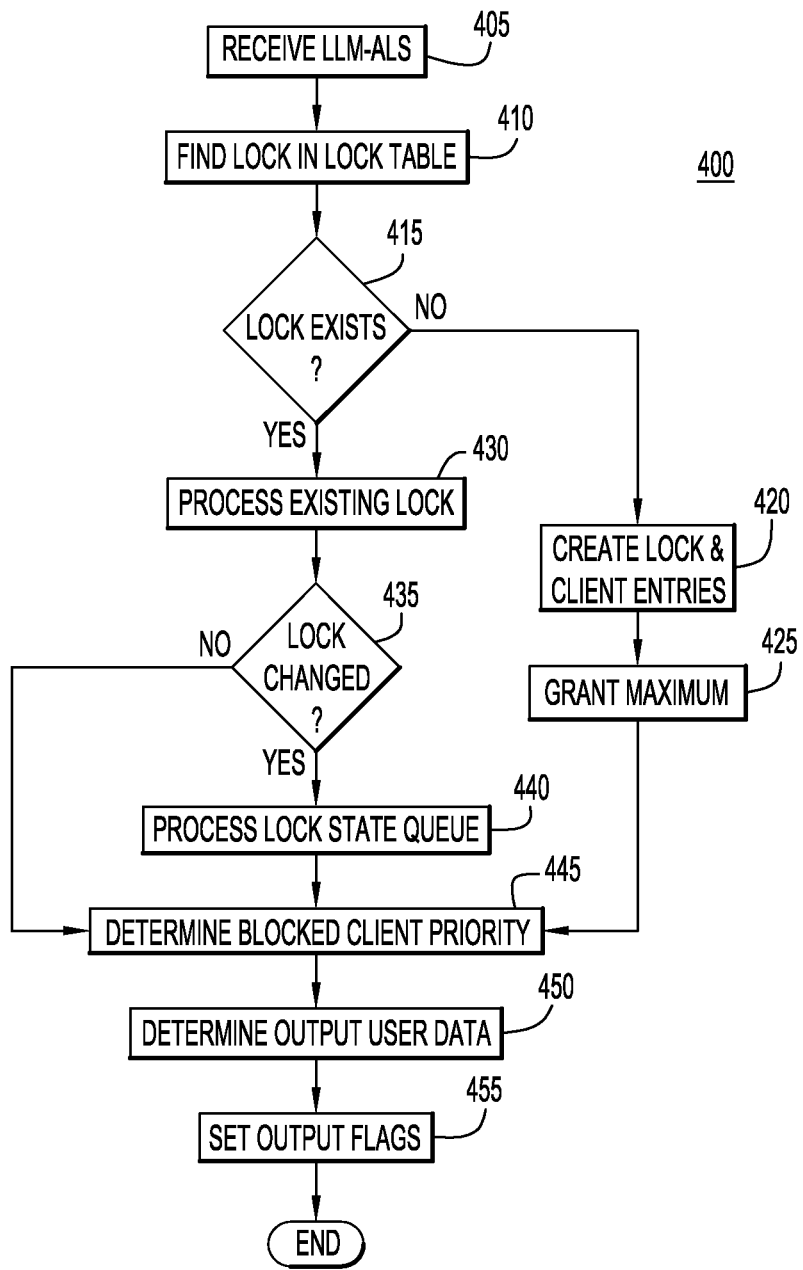
FIG. 6 is a flowchart depicting an exemplary method of a global lock manager processing lock grant and release requests, according to an embodiment of the invention.

Referring now to FIG. 6, reference numeral 400 generally designates a flow chart depicting an exemplary method of a global lock manager processing lock grant and release requests, according to an embodiment of the invention. In step 405, the global lock manager (GLM) receives an LLM-ALS from a local lock manager ("LLM A") requesting a lock grant or release for a particular lock, and in step 410 searches for the lock in a lock table on the GLM. In step 415 the GLM determines if the lock exists in the table, and if not, in step 420 creates lock and client entries in the lock table, and in step 425 grants the requested Maximum lock mode to the requesting LLM, and proceeds to step 445.

Figure 7:
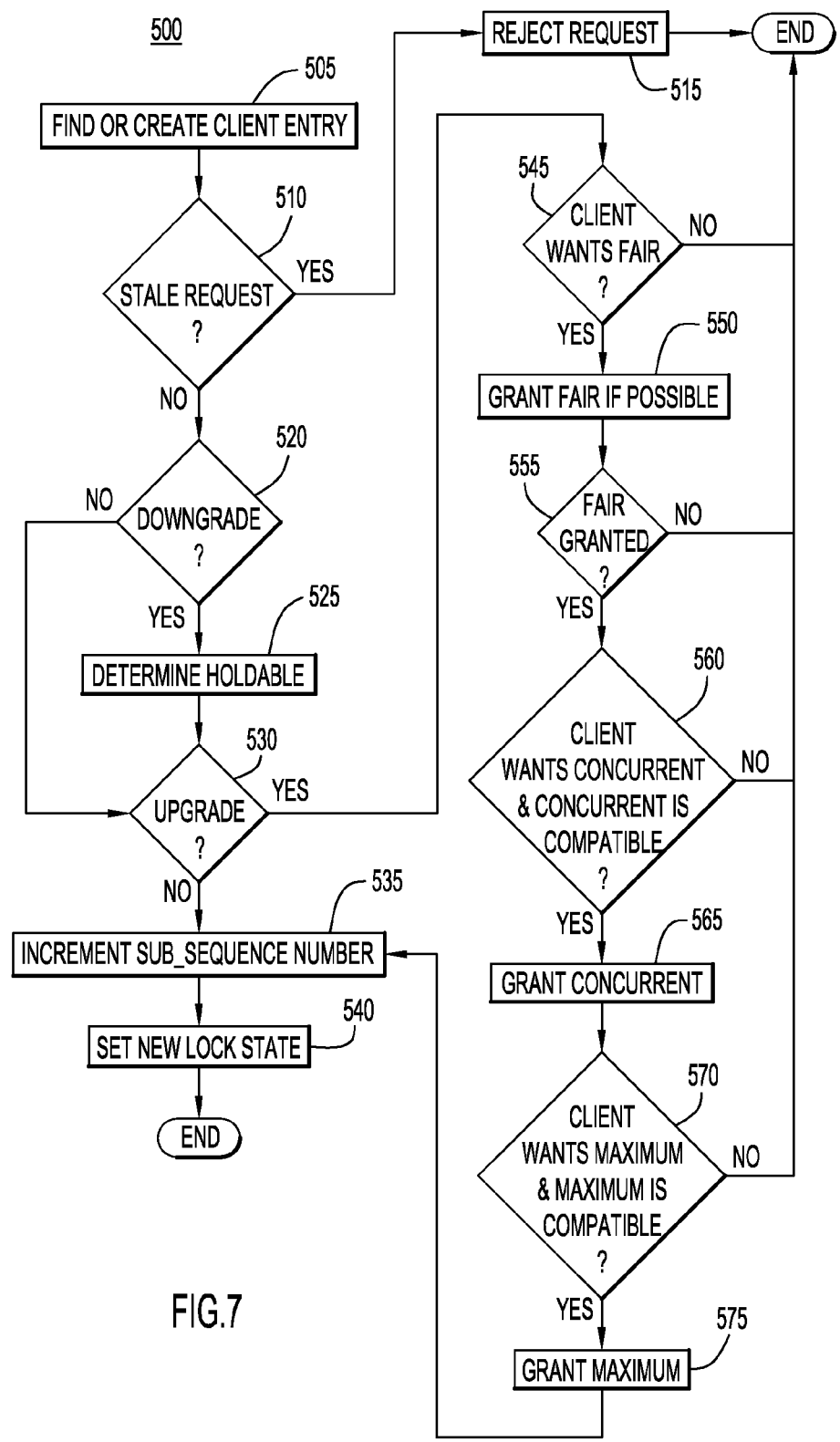
FIG. 7 is a flowchart depicting an exemplary method of a global lock manager processing an existing lock, according to an embodiment of the invention.

If the lock exists, then in step 430 the GLM processes the lock and creates a client entry for the received lock request in the priority queue for this lock (or finds and uses an existing client entry in the queue), as is further described with respect to FIG. 7. In step 435 the GLM determines if the lock has changed, and if yes, then in step 440 the GLM processes the priority queue, as is further described with respect to FIGS. 8-10. The client entry comprises the information for the local lock state received from the LLM (the LLM-ALS) as well as the global lock state created by the GLM (the GLM-ALS) in response to the LLM-ALS. The priority queue may also be sorted at this time, for example by moving high priority client entries toward the top of the queue, and moving lower priority client entries toward the bottom of the queue. The GLM then proceeds to step 445.

In step 445 the GLM determines the value for "Blocked_client_priority", which is the highest priority of a remote client that member LLM A is blocking, and in step 450 the GLM determines the "Output_user_data", which is the user data of all client lock holders, e.g., the sum total of all holders' user data. In step 455 the GLM may set any output flags to notify the LLM of any special conditions. For example, a reclaim can arrive via a regular GLM-ALS, or as a "notification" GLM-ALS having a special output flag set. Then process 400 ends.

Referring now to FIG. 7, reference numeral 500 generally designates a flow chart depicting an exemplary method of a global lock manager processing an existing lock, according to an embodiment of the invention. The depicted process 500 is an embodiment of step 430 of process 400. In step 505, the GLM finds the client entry associated with the lock request, and if an entry does not exist, creates one. In step 510, the GLM determines if the lock request in the client entry is stale or outdated, for example by comparing the values of the Sequence_Number and Sub_Sequence_Number of the local lock stale in the client entry against the Sequence_Number and Sub_Sequence_Number of the last LLM-ALS processed. If the lock request is stale, the GLM proceeds to step 515 and rejects the lock request LLM-ALS, and then ends the process 500, and if it is not stale, then the GLM proceeds to step 520.

In step 520, the GLM determines if the lock request is requesting a downgrade in the lock, and if yes proceeds to step 525 and then step 530, and if no proceeds to step 530. In step 525, the GLM determines the value of "Holdable." For a standard GLM-ALS sent in response to an LLM-ALS, Holdable is equal to the highest mode that can be granted (which may be none) and for a reclaim GLM-ALS, Holdable remains the same as it was for the last GLM-ALS that was sent to the LLM under reclaim but Grantable is reduced. The Holdable value can only be increased by the GLM, and can only be reduced by an LLM. The GLM increases (or grants) Holdable as a result of an LLM asking for Fair, Concurrent and/or Maximum modes.

in step 530, the GLM determines it the lock request is requesting an upgrade in the lock, and if no proceeds to step 535, where it increments the value of the "Sub_Sequence_Number" field in the GLM-ALS, for example by incrementing the signed integer value from the last GLM-ALS sent in response to the same LLM. Then in step 540 the GLM sets the new lock state for the LLM, and ends process 500 (thus returning to process 400 at step 435 as previously described). If an upgrade is requested, then the GLM tries to grant the requested upgrade, in steps 545 through 575, In step 545, the GLM determines if the LLM, associated with the client entry wants a Fair lock mode, and if not ends process 500. If yes, then in step 550 the GLM grants the Fair lock mode if it is possible, e.g., if it is compatible with both the Fair lock mode of all client entries having a higher priority than this particular client entry and the holdable lock mode of all client entries in the priority queue for this lock. In step 555 the GLM determines if the Fair lock mode was granted for this client entry, and if not ends process 500. If yes, then in step 560 the GLM determines if the LLM associated with the client entry wants a Concurrent lock mode, and if its Concurrent lock mode is compatible, e.g., if no client entry is currently awaiting a Fair lock mode and the requested Concurrent lock mode is compatible with the holdable lock mode of all client entries in the priority queue for this lock. If yes, then in step 565 the GLM grants the Concurrent lock mode, and if not ends process 500. In step 570 the GLM determines if the LLM associated with the client entry wants a Maximum lock mode, and if its Maximum lock mode is compatible with the Concurrent lock mode of all client entries in the priority queue for this lock. If yes, then in step 575 the GLM grants the Maximum lock mode and then proceeds to steps 535 and 540, and if not, the GLM ends process 500.

Figure 8:
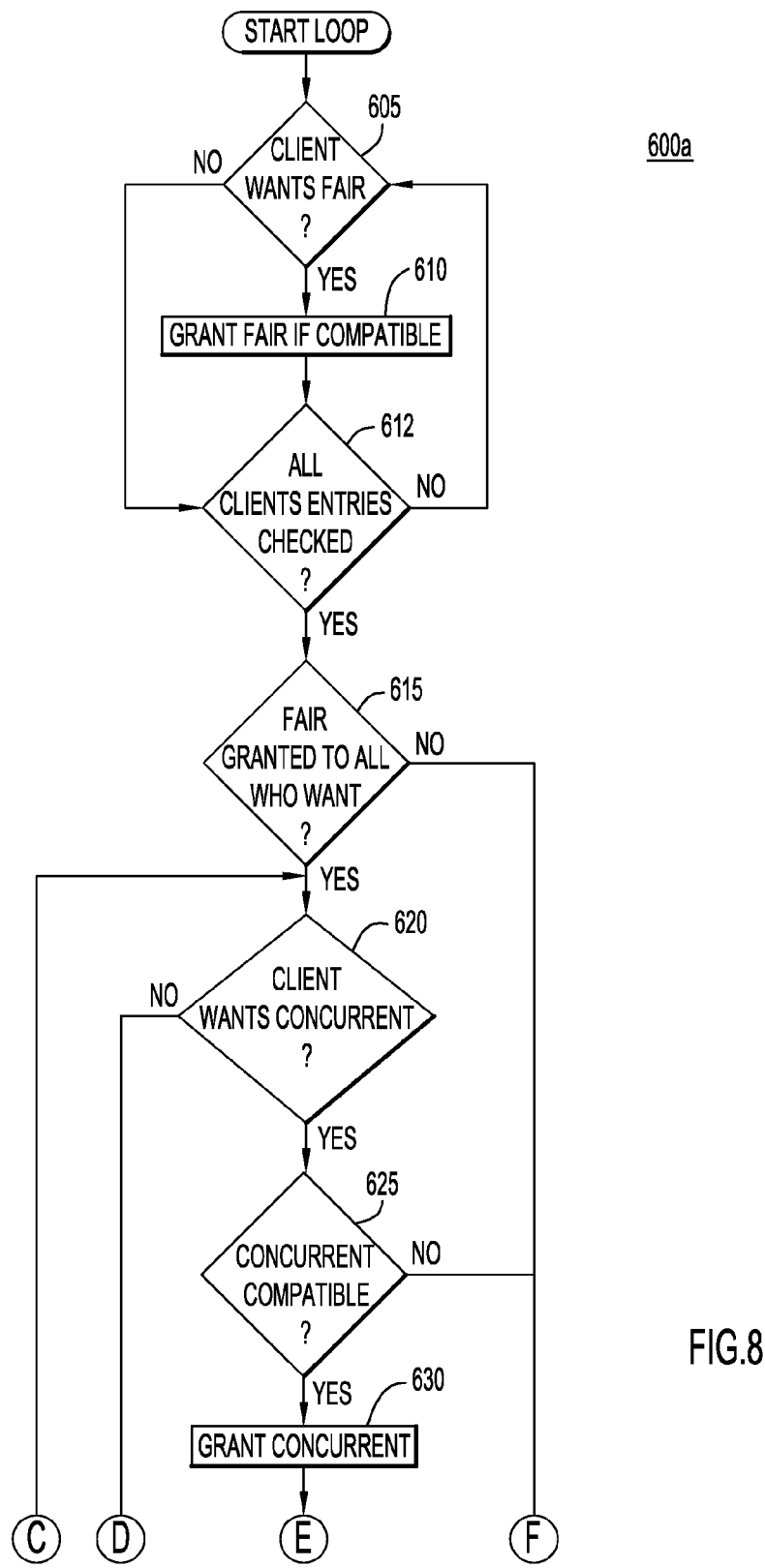
FIGS. 8, 9 and 10 are flowcharts depicting an exemplary method of a global lock manager processing a priority queue, according to an embodiment of the invention.
Figure 9:
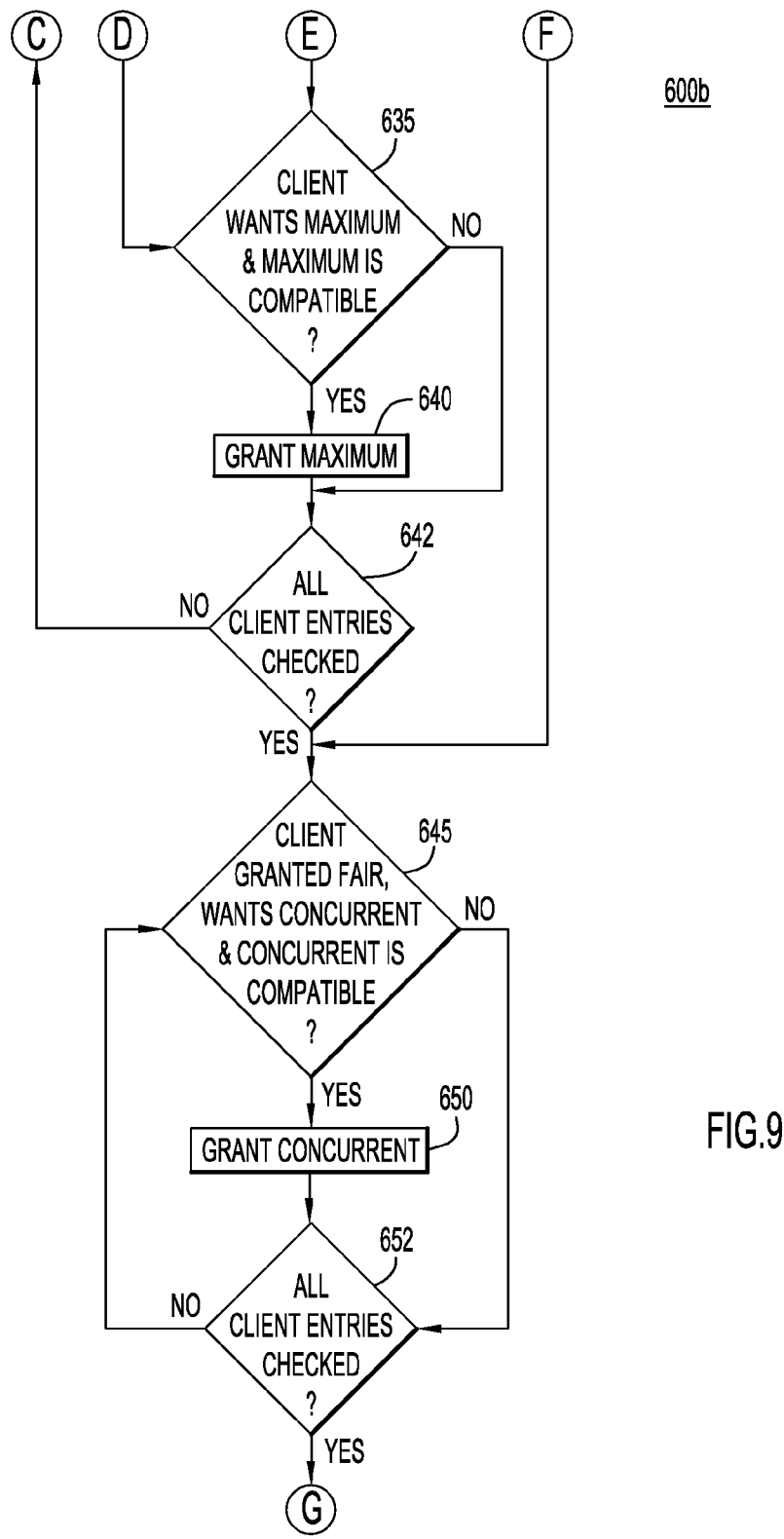
Figure 10:
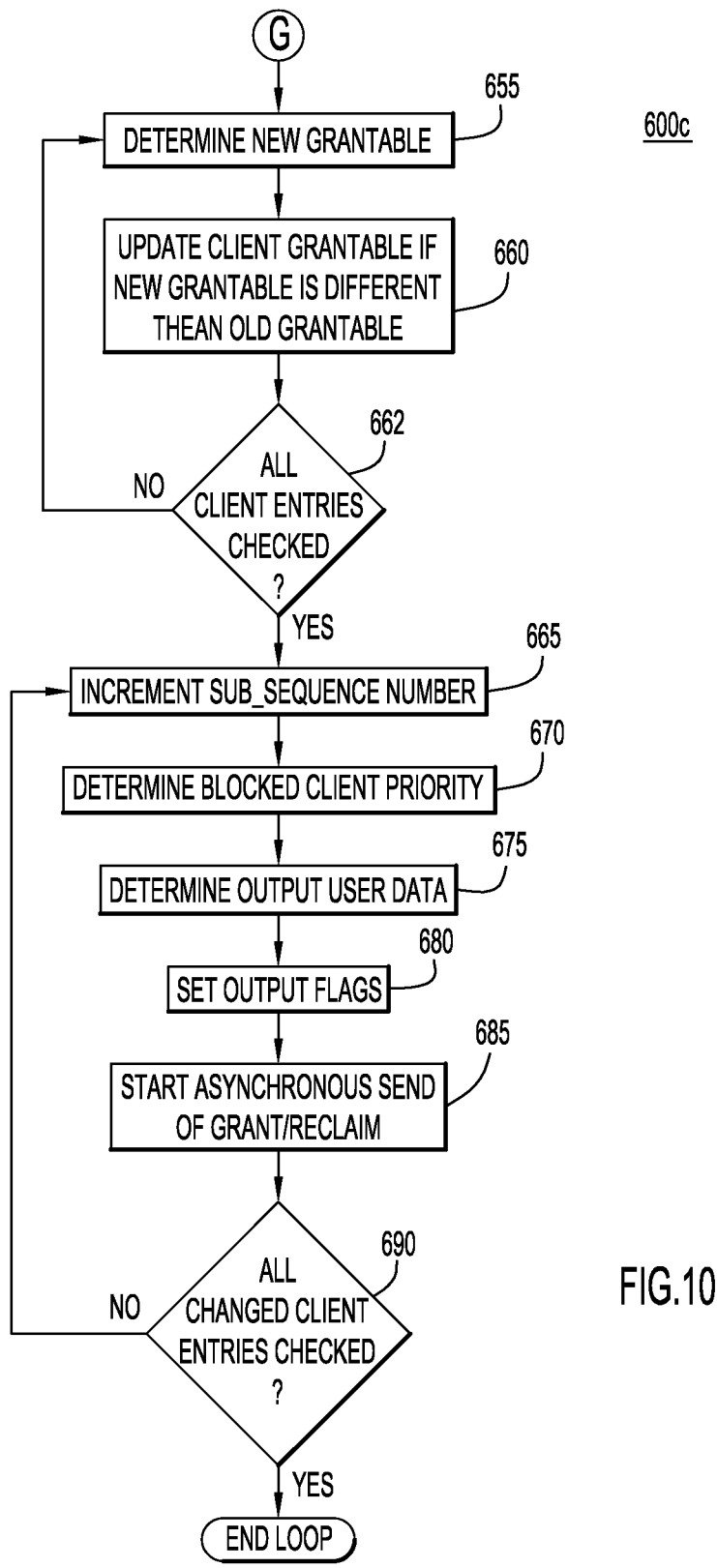

Referring now to FIGS. 8, 9 and 10, reference numerals 600*a*, 600*b* and 600*c* generally designate a flow chart depicting an exemplary method of a global lock manager processing a priority queue of client entries, according to an embodiment of the invention. The depicted process 500 is an embodiment of step 440 of process 400. In step 605, the GLM determines if the LLM associated with the client entry wants a Fair lock mode, if yes proceeds to step 610 and grants the Fair lock mode if it is compatible with the holdable lock mode of all client entries in the priority queue for this lock, and then proceeds to step 612, and if not, remembers that this grant failed and proceeds to step 612. In step 612, the GLM determines if all client entries have been checked to determine if they want Fair, if not, returns to step 605, and if yes, proceeds to step 615. In step 615, the GLM determines if Fair lock mode has been granted to all client entries that want Fair, if yes proceeds to step 620 and if not proceeds to step 645.

In step 620 the GLM determines if the LLM associated with the client entry wants a Concurrent lock mode, if yes proceeds to step 625 and if not proceeds to step 635. In step 625, the GLM determines if the requested Concurrent lock mode is compatible with the Fair and Holdable lock modes of all client entries in the priority queue for this lock. If yes, then in step 630 the GLM grants the Concurrent lock mode and proceeds to step 635, and if not, proceeds to step 645. In step 635, the GLM determines if the LLM associated with the client entry wants a Maximum lock mode, and if its Maximum lock mode is compatible with the Concurrent and Holdable lock modes of all client entries in the priority queue for this lock and if not, the GLM proceeds to step 642. If yes, then in step 640 the GLM grants the Maximum lock mode and then proceeds to step 642. In step 642, the GLM determines if all client entries have been checked to determine if they want Concurrent and/or Maximum lock modes, if no returns to step 620 to process the next client entry, and if yes proceeds to step 645.

In step 645, the GLM determines if the client entry wants a "top up" e.g., was granted its Fair lock, wants Concurrent lock mode, and if Concurrent lock mode is compatible with the holdable lock mode of all client entries in the priority queue for this lock. If not, the GLM proceeds to step 652, and if yes, the GLM grants the Concurrent lock mode and then proceeds to step 652. In step 652, the GLM determines it all client entries have been checked to determine if they want a "top up", if no returns to step 645 to "top up" the next client, and if yes proceeds to step 655. In step 655, the GLM determines the new Grantable for the client that will not block any higher priority waiters in the priority queue, and in step 660 updates Grantable in the client entry if the new determined Grantable is different than the previous Grantable value for that client entry. In step 662, the GLM determines if all client entries have been checked and their new Grantables determined, if no returns to step 655 to process the next client entry, and if yes proceeds to step 665.

Steps 665 through 685 are performed for each changed client entry (grant or reclaim). In step 665, the GLM increments the value of the "Sub_Sequence_Number" field in the GLM-ALS, for example by incrementing the signed integer value from the last GLM-ALS sent in response to the same LLM. In step 670 the GLM determines the value for "Blocked_client_priority", which is the highest priority of a remote client that is blocked by the current client entry, and in step 675 the GLM determines the "Output_user_data", which is the user data of all client lock holders, e.g., the sum total of all holders' user data. In step 680 the GLM may set any output flags to notify the LLM of any special conditions.

For example, a reclaim can arrive via a regular GLM-ALS, or as a "notification" GLM-ALS having a special output flag set. In step 685, the GLM starts asynchronous sending of the GLM-ALS granting or reclaiming a lock to the LLM associated with the client entry. In step 690, the GLM determines if all changed client entries have been checked, if no returns to step 665, and if yes, ends process 600 and returns to process 400 at step 445 as previously described.

As can be understood from the preceding description, process 600 attempts to grant lock requests in priority order, where at each priority level, requests are granted in Fair-Concurrent-Maximum order, where Concurrent will only be considered if all Fair requests are satisfied, and Maximum will only be considered if all Fair and Concurrent requests are satisfied. The exception to this rule is the "top up" policy (steps 645 and 650), in which, once a client has been granted Fair lock mode, due to the cost of the communication notifying it, the GLM "tops up" the client by granting Concurrent requests outstanding for that same client prior to some other client entry's Fair lock mode, if they do not conflict with "Holdable." The "top up" policy also improves concurrency.

An embodiment of the described methods 400, 500 and 600 is shown in the following exemplary pseudo-code.

```
=======Process a Set Lock State request==========
Hash the lock name
Latch the hash class
Look up the look in the look table
If no lock exists
   Grant maximum (Since no one else is interested in the lock)
else
   process_existing_lock( )
if the lock state changed (other than by creating a new lock) (The lock state has
changed if
      the requester reduced its holdable or the GLM increased its
      holdable or reduced its grantable)
   {
   do_grants( ) (Grant / Reclaim processing)
   }
finish_update( )
Put the response to the Set Lock State in the response buffer.
=================================================
process_existing_lock( )
{
   Find the client entry for the requesting LLM (If it is there)
   If client entry found
      {
      Validate request against existing client state (This includes the sequence number
                              check for stale requests)
      If request not valid
         {
         generate reject response
         return
         }
      else
         {
         Determine if this is a non FIFO request (This is a non FIFO request if the
"increase concurrency" flag
                  is set in the request and the client does not currently hold
its fair mode)
            If this is a lock downgrade (Client is reducing holdable in some way, does not
need to be a release)
               {
               If confirmed holdable does not match actual holdable (Assume client has
missed a grant in flight)
                  {
                  Set the requested holdable to the GLB of the existing holdable and the
requested maximum, i.e.,
                     to the maximum of the existing holdable and the requested maximum
                  }
               }
            }
      }
   else (Client entry does not yet exist}
```

```
    {
        Allocate client entry and add it to priority queue for this lock
    }
/* At this point we have the client entry either because we found it    */
/* or have just created it and added it.                                */
// Check for downgrade or upgrade.
//
// NB: Must check for downgrade before upgrade. Client could be doing a
// release by lowering holdable while at the same time indicating that it
// wants it back by raising maximum, fair, or concurrent. If this is the
// case we downgrade the clients holdable but leave it in the list as a
// waiter who is waiting for the lock in fair, concurrent, or maximum
// mode.
    If this is a downgrade (Holdable is being reduced)
        {
           Reduce the holdable as requested
           If this is an upgrade (Any of fair, concurrent, maximum are unsatisfied)
              try_grant( )
        }
    else if this is an upgrade (Any of fair, concurrent, maximum are unsatisfied)
        {
           try_grant( )
        }
    increment subsequence number
    Set new lock state
}
====================================================
try_grant( )
{
    if client wants fair
        {
           grant fair if the fair mode is compatible with the fair modes of
              all clients above this one and with all other holdables
        }
    If we granted fair mode and no client is waiting for fair mode and this client
        still wants something (concurrent or maximum)
        {
           If client wants concurrent and concurrent is compatible with all other holdables
              grant concurrent
           If client wants maximum and maximum is compatible with all the other concurrents
              grant maximum
        }
}
At this point we have only changed the client entry of the requester. But since that
resulted in a lock state change, we may be able to do additional grants and we may
discover that we need to do a reclaim because the requester become a waiter that should
not be blocked.
The first thing we attempt is grants. We try to grant fair to any client entry
awaiting fair.
As we go through this code, if we change the lock state of a client entry we
put it on a local list called the grant list.
do_grants( )
{
  // Try to grant fair
  loop through all client entries from top to bottom (i.e., in priority order)
    {
      If this client wants fair
         {
            If its fair mode is compatible with all other holders
               {
                  Remember that we granted fair to at least one client
                  Grant fair
               }
            else
               {
                  Failed to make a grant, remember that at least one fair not granted
               }
         }
    }
  If we granted fair to everyone that wants it
    {
       loop through all client entries from top to bottom (i.e., in priority order)
         {
            If client wants concurrent
              {
                 If concurrent is compatible with all other holdables
                    grant concurrent
                 else // Cannot grant concurrent
                    terminate the loop
```

```
            }
        If client wants maximum
            {
                If maximum is compatible with all other concurrents of all other client
entries
                    grant maximum
            }
        }
    }
    If we granted anything to this client
        Put the client entry on the grant list
    // Now top up the ones just granted fair
    loop through all client entries from top to bottom (i.e., in priority order)
    {
        If we just granted fair to this client and it wants concurrent
            {
                If the desired concurrent is compatible with all other holdables
                    grant concurrent
            }
    }
}
/* First find the fair mode of either the first waiter (no non FIFO waiters    */
/* present) or of all the non FIFO waiters. This is the set for whom a reclaim*/
/* will be issued.                                                             */
/* Having found the set for the reclaim, then find all subsequent waiters     */
/* whose fair mode is compatible with the first set.   Quit when we find*/
/* the first one that is not compatible with the set.    This is the set      */
/* for which a reclaim will be issued.                                         */
/* At the same time find the priority of the first blocked waiter.   This    */
/* will be used to tell client entries the priority of the first waiter       */
/* they are blocking.   Also remember if any of the waiters are non FIFOs         */
// Now that the holdables (if any) have been updated, go through the list
// again recalculating the grantables. If any client's grantable changes
// put them on the grant list if not already there.
loop through all client entries from top to bottom (i.e., in priority order)
{
    Calculate a new grantable for this client entry such that its new grantable
    will not block any of the above described waiters on whose behalf we are
    issuing reclaim
    If the new grantable is not the same as the old grantable
        Put this client entry on the grant list if not already there
    If this client's blocked client priority has changed or if it
        is blocking a non FIFO waiter
        {
            Put this client entry on the grant list if not already there
        }
}
    loop through each client entry on the grant list (This is the list of all
        client entries for whom grant / reclaim is to be done
        {
            Increment the sub_sequence_number
            finish_update( )
            Send the grant / reclaim asynchronously with the following properties:
                1. No one waits for the send to happen
                2. In the rare case that the sends can't keep pace with the state changes,
                    a. the pending sends don't interface in any way with the state changes
happening,
                    b. When a send does happen, it sends the latest state, whatever that might be
        }
}
=====================================================
finish_update( )
{
    Determine blocked client priority
    Determine output user data
    Set output flags
}
```

The present embodiment may also provide an optimized "upgrade with release" request. This request carries with it two types at actions: (1) it the upgrade is successful, it behaves like a normal request. (2) if the upgrade fails, the lock is released or downgraded. This can simply be done by specifying: H=<release mode> F=<want mode>. In a request driven Lock Manager implementation, two requests would be needed to fulfill the requirement: a downgrade and an upgrade. There are two possible orderings:

(A) First downgrade, then upgrade. This consists of 2 requests and furthermore, even if the upgrade succeeds, no assumption can be made about the validity (coherency) of the data, due to the fact a downgrade was done first.
(B) First upgrade; if it fails, release. Here the data remains coherent, but this scheme is poor for concurrency, since it can easily introduce deadlocks, as per the following scenario:
app1 holds S, upgrade with release to X
app2 holds S, upgrade with release to X Here, app1 is deadlocked with app2. The state-based scheme of the present embodiments avoids both (A) and (B).

The present embodiments also provide an optimized "retrieve user data and conflict information" (TryInstant) request. This request is a form of an "instant" request whose most important feature is that the state of the system is not mutated: if the lock could be granted, SUCCESS is returned, but the state of the system is unchanged. If the lock could not be granted, FAILURE is returned and again the state of the system is unchanged. Additionally, user attributes are returned. The usefulness of this type of request is to determine if there is conflict on a given lock, in a given mode. If there is, the returned user data can give implicit information about the holders of the lock (for example, whether a certain operation is currently in progress). Note that without a TryInstant, this would need to be done with a request which—if granted—would then need cancelling (meaning communication cost).

In the present embodiments, normally all lock requests are handled in a FIFO order. As illustrated below this could be undesirable in the upgrade case:
M1: app1 holds S
M1: app2 wants X
M1: app1 wants to upgrade to X
In this example app2 is queued first, causing a deadlock between app1 and app2. However, if app1 could be granted first, it would proceed allowing app2 to eventually finish as well. The present embodiments are very flexible, and allow two kinds of list within each priority queue: a FIFO list, and an unordered, ahead-of-FIFO non-FIFO list.

Additionally, the present embodiments provide asynchronous lock release. In many cases the release of a lock can be done asynchronously—control is returned to the caller, and the GLM is notified at a later time, either by an asynchronous process, or by remembering the change and sending it with a later request. The benefit of this is that the release is instantaneous.

The present embodiments provide numerous benefits and advantages over standard concurrent systems, by reducing inter-member communications, which are generally the gating factor determining performance (defined here as the time to obtain/release a resource). As has been described previously, the present embodiments are able to keep inter-member communication to a bare minimum by:
Communication being state based, with each state being a complete snapshot of a resource's holdings/requests;
expressing the interest of multiple applications (transactions) in each communication;
Allowing multiple in-flight communications between the LLM and GLM and managing them efficiently;
Favoring concurrency while being starvation free;
Providing an efficient mechanism to obtain remotely held locks and reducing lock ping-ponging;
FIFO and Non-FIFO ordering; and
Asynchronous lock release.

The two-level lock manager system also provides an unparalleled high availability solution, in that if any member of the computer system crashes, only locks that are in-flight (on the wire) at the time are lost. All other locks are remembered, and crash recovery may proceed in a way far quicker than the conventional one-lock manager systems.

B. Global Deadlock Resolution

Deadlocks may occur in the lock management system of the present embodiments, as in any distributed system. While it is theoretically possible to prevent or avoid deadlocks in a distributed system, it is usually cost-prohibitive to attempt because of the enormous amounts of network traffic and inter-member messages that would be required. Instead, the present embodiments focus on detecting and resolving deadlocks in a manner that does not create significant performance problems. In the present embodiments, each local deadlock detector (LDD) handles local deadlocks among applications on its local node, and the global deadlock detector (GDD) handles global deadlocks among applications on different nodes.

For example, on an individual member, local applications may be deadlocked over a resource, and the local deadlock detector (LDD) detects and resolves these local deadlocks. Sometimes, however, a local application may be deadlocked with a remote application on another member, and the LDDs of the members are not able to resolve this global deadlock. This can occur, for example, in the following scenario:
App1 on Member 1 holds a lock (lock mode S) on resource r1 and is requesting a lock (lock mode X) on resource r2
App22 on Member 2 holds a lock (lock mode S) on resource r2 and is requesting a lock (lock mode X) on resource r1

Here, there is a global deadlock between App1 and App22, that cannot be resolved by the LDDs of the members. Accordingly, the LDDs send local lock wait and lock interests to the GDD, which generates a remote lock wait between each waiter and each reclaimed lock holder, and uses it to detect and resolve this global deadlock, e.g., by choosing one of the waiters as a victim that will release its lock request and allow the other waiter to obtain the requested lock.

The GDD is able to resolve global deadlocks entirely independent of the GLM. This independence maintains the high performance of the two-level locking system, because the GLM is able to handle its lock management at a higher level, i.e., member-to-member locks, instead of having to collect and process information about individual applications and lock requests on various members. In other words, the GLM is not required to know what application on a member is requesting a lock—it only needs to know what the situation is between a member requesting a lock and the member holding the lock. To involve the GLM in the deadlock process would result in significant processing and network overhead at the GLM, thus obviating the performance benefits previously described. Therefore, the present embodiments provide for the GDD to detect and resolve global deadlocks without any information from the GLM. This global deadlock detection scheme defects all local and global deadlocks.

Figure 11:
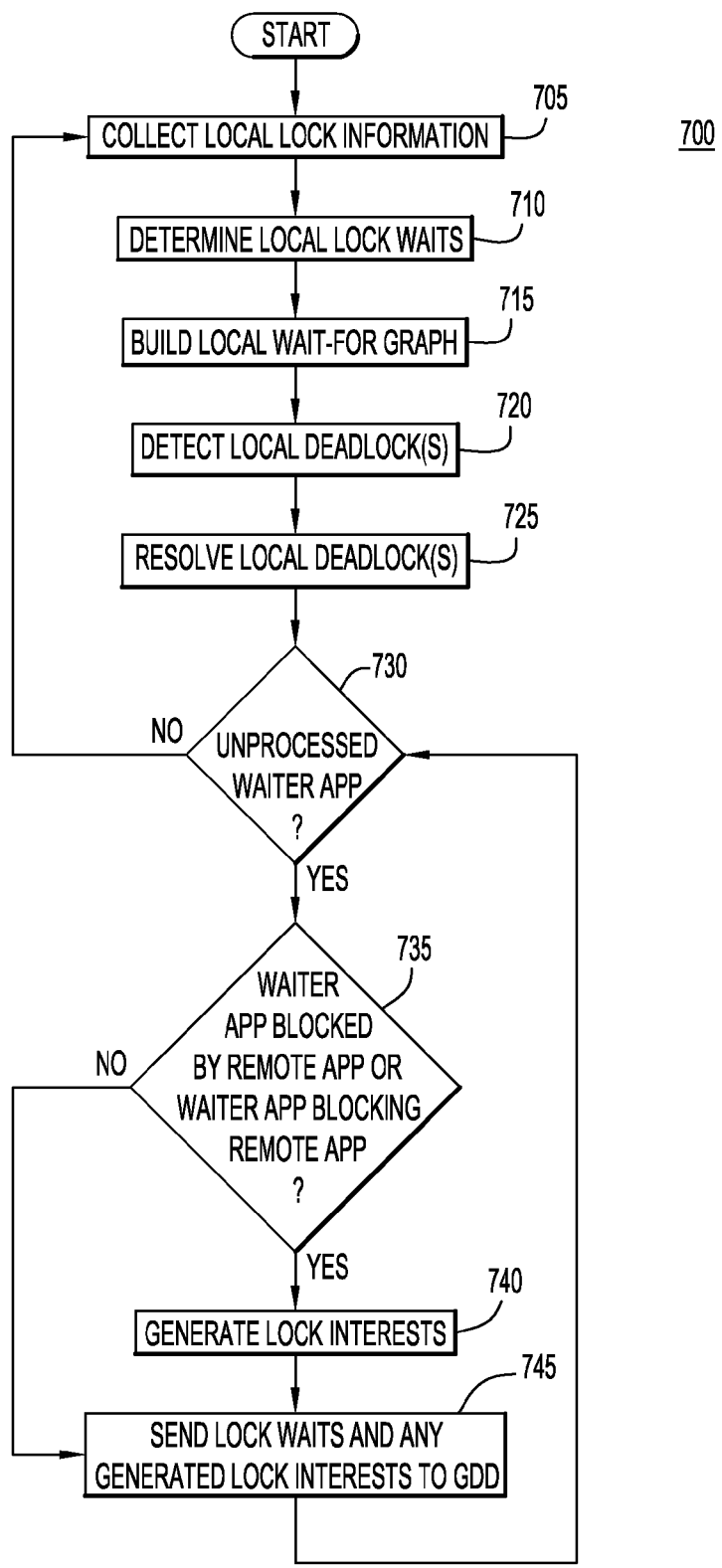
FIG. 11 is a flowchart depicting an exemplary method of a local deadlock detector detecting deadlocks, according to an embodiment of the invention.

Referring now to FIG. 11, reference numeral 700 generally designates a flow chart depicting an exemplary method of a local deadlock detector detecting deadlocks, according to an embodiment of the invention. These steps may be carried out by, e.g., each local deadlock detector (LDD) on each member node 104 of the system 100. In step 705, the local deadlock detector (LDD) monitors and collects local lock information about the local applications, in step 710 determines local lock waits based on the local lock wait information, and in step 715 uses the local lock waits to build a local wait graph (also called a local wait-for graph or LWG). In step 720, the LDD detects local deadlock(s) in the local wait graph, e.g., cycles in the graph, and then in step 725 resolves the deadlock(s), e.g., by selecting one or more local applications as victims to be killed so that the deadlock is broken.

In step 730, the LDD determines if there is a local application waiting for a lock request to be granted (an "unprocessed waiter app"). If not, the LDD returns to step 705 and continues to monitor local locks. If yes, then in step 735, the MD determines if the waiter application on its member node has lock requests that are blocked by a remote application, or if a waiter application has lock grants that are blocking a remote application and causing remote lock waits. If yes, then in step 740 the LDD generates lock interests, and then proceeds to step 745. If not, then The LDD proceeds to step 745 and sends the lock waits (from step 710) and any generated lock interests (collectively "lock conflict information") to the Global Deadlock Detector (GDD), and then returns to step 730 to check for other unprocessed local waiter applications. The lock interests help identify remote lock waiters and remote lock waiters (a lock holder whose lock is reclaimed by the GLM in order to satisfy an application running on a remote member).

For example, consider the following scenario:
For resource r1:
Member 1 holds S lock for Task1
Member 2 wants X lock for Task2
Member 3 wants X lock for Task3
Member 4 wants S lock for Task4
The lock held by Member 1 is under reclaim by the GLM
The LDD on Member 1 sends to GDD:
Task1 is a remote lock waitee (mode S); lock under reclaim
The LDD on Member 2 sends to GDD:
Task2 is a remote lock waiter (mode X)
The LDD on Member 3 sends to GDD:
Task3 is a remote lock waiter (mode X)
The LDD on Member 4 sends to GDD:
Task 4 is a remote lock waiter (mode S)

In the above example, after Task1 releases the lock, it would be granted to Task2, Task3 and then Task4. This order is important because the lock requests must be granted in the order the order they are received (Task4 cannot be granted the lock even if it is compatible with the current holder). Because the GLM is completely unaware and uninvolved in the global deadlock detection, the GDD cannot determine the direct lock wait relationships between the waiters Task2, Task3, Task4. So, it is unable to build any global/remote lock wait edges involving two waiters. Instead, the GDD of the present embodiments uses an alternative approach of completely relying on lock wait edge between waiters and holders. To compensate for the missing lock wait edges between two waiters, it builds a global lock wait edge between every waiter and every reclaimed holder. In this example, global lock wait edges would be Task4->Task1, Task3->Task1, Task2->Task1. These edges are sufficient to break the any deadlock that involves this lock.

Figure 12:
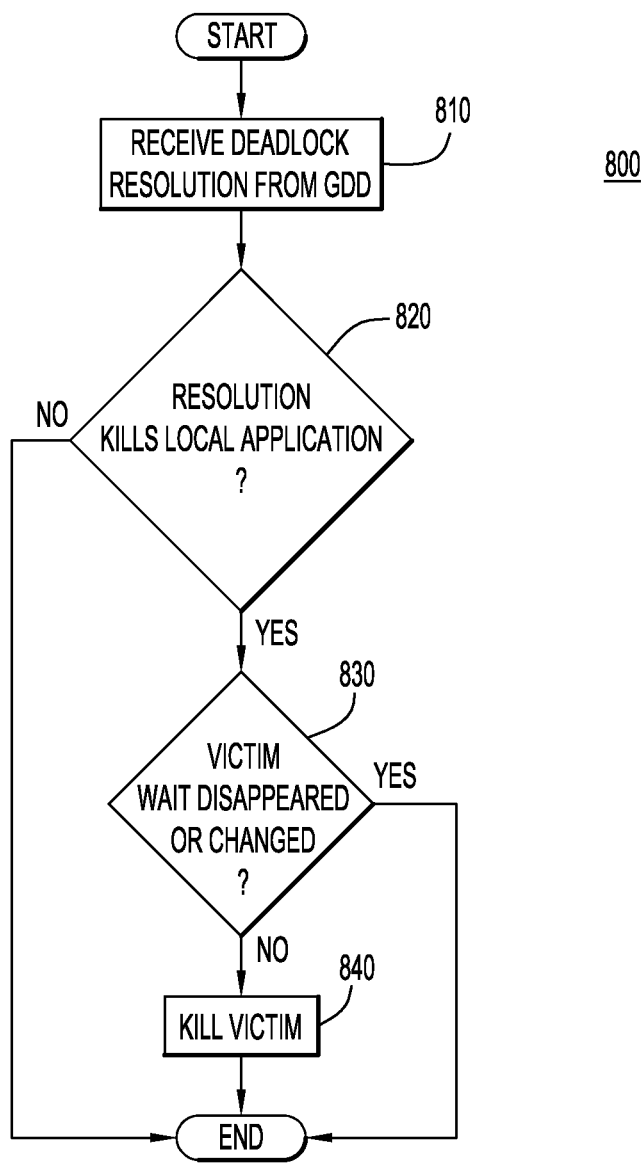
FIG. 12 is a flowchart depicting an exemplary method of victim handling by a local deadlock detector, according to an embodiment of the invention.

Referring now to FIG. 12, reference numeral 800 generally designates a flow chart depicting an exemplary method of victim handling by a local deadlock detector, according to an embodiment of the invention. These steps may be carried out by, e.g., each local deadlock detector (GDD) on each member node 104 of the system 100. In step 800, the local deadlock detector (LDD) receives a deadlock resolution from the GDD, and in step 820 determines whether the resolution kills a local application. For example, assume that Task2 is chosen as the victim in the scenario above. The LDD on Member 2 examines the deadlock resolution it has received from the GDD, and in step 820 determines that its local task Task2 is a victim, and then proceeds to step 830, where it determines whether the wait for the victim (Task2) has changed or disappeared, in order to protect from unnecessary killing of victims. If the wait has changed or disappeared, then the LDD ends the victim handling process. If the wait has not changed or disappeared, then the LDD proceeds to step 840 and kills the victim (which releases all locks held or requested by the victim), and the process 800 ends. Another LDD, e.g., the LDD on Member 3, in step 820 determines that the resolution does not kill the local application (Task3), and then the process 800 ends. The deadlock having been resolved, Member 3 will receive the lock and assign it to Task3.

Figure 13:
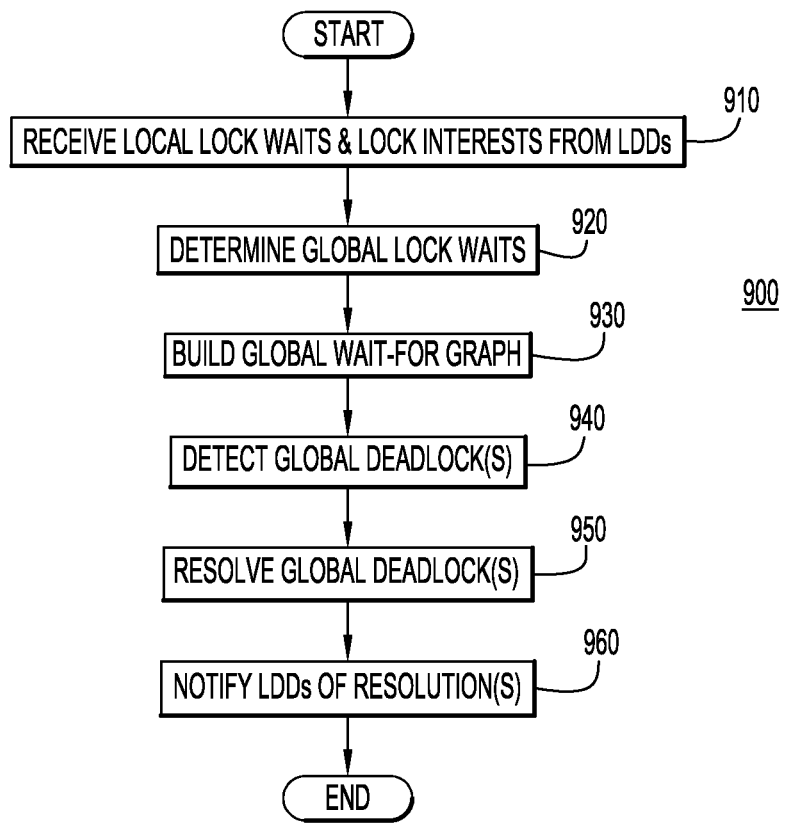
FIG. 13 is a flowchart depicting an exemplary method of a global deadlock detector detecting and resolving global deadlocks, according to an embodiment of the invention.

Referring now to FIG. 13, reference numeral 900 generally designates a flowchart depicting an exemplary method of a global deadlock detector detecting and resolving global deadlocks, according to an embodiment of the invention. In step 910, the GDD receives the lock conflict information (e.g., local lock waits and lock interests) from the LDDs in the system, and e.g., stores this information in storage area 75, and in step 920, the GDD uses this received information to determine global lock waits between each waiter and each reclaimed lock holder (waitee). The GDD does not have other information, for example, the GDD is not aware of global lock request information, nor does it know the order of the global lock requests. Instead, the GDD relies on the local lock waits and lock interests that it receives from the LDDs to determine the lock waits. For example, in the scenario above, the GDD only knows that Task2, Task3 and Task4 are waiters, and that Member 1's lock is under reclaim by the GLM.

In step 930, the GDD uses the global lock waits to build a global wait graph (also called a global wait-for graph or GWG), which may be, e.g., stored in storage area 75, and in step 940 the GDD detects global deadlock(s) in the global wait graph, e.g., cycles in the graph, and then in step 950 resolves the deadlock(s) e.g., by selecting one or more applications as victims to be killed so that the deadlock is broken. Typically, the victim or victim(s) are the waiters that require the least overhead to kill (rollback), but the GDD is permitted to select a suboptimal victim. In step 960, the GDD notifies the LDDs of resolved global deadlock(s), so that LDDs can kill the designated victim(s). Process 900 then ends.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a solid state disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, a phase change memory storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, e.g., an object oriented programming language such as Java, Smalltalk, C++ or the like, or a conventional procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It is to be understood that the software for the computer systems of the present invention embodiments may be implemented in any desired computer language and could be developed by one of ordinary skill in the computer arts based on the functional descriptions contained in the specification and flow charts illustrated in the drawings. By way of example only, the software may be implemented in the C#, C++, Python, Java, or PHP programming languages. Further, any references herein of software performing various functions generally refer to computer systems or processors performing those functions under software control.

The computer systems of the present invention embodiments may alternatively be implemented by any type of hardware and/or other processing circuitry. The various functions of the computer systems may be distributed in any manner among any quantity of software modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operation steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A processing system suitable for storing and/or executing program code may be implemented by any conventional or other computer or processing systems preferably equipped with a display or monitor, a base (e.g., including the processor, memories and/or internal or external communications devices (e.g., modem, network cards, etc.) and optional input devices (e.g., a keyboard, mouse or other input device)). The system can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the system to become coupled to other processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, method and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometime be executed in the reverse order, depending on the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. If with be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing locks on shared resources in a distributed computer system comprising:
    receiving at a first primary node a first local lock state from a first secondary node of a plurality of secondary nodes, wherein the first local lock state comprises a lock request for access to a shared resource, a requested lock mode, and merged state information identifying a current state of a plurality of different locks for shared resources held by a plurality of tasks on the first secondary node and indicating a group lock mode representing a combined lock mode for the plurality of tasks on the first secondary node holding the plurality of different locks on the shared resources, wherein the group lock mode is generated by comparing different lock modes held by the plurality of tasks and identifying a lock mode with a corresponding set of compatible lock modes including each of the different lock modes held by the plurality of tasks;
    granting the lock request at the first primary node in response to an absence of conflicts;
    generating at the first primary node a first global lock state in response to the first local lock state; and
    communicating the first global lock state from the first primary node to the first secondary node.

2. The method of claim 1, wherein a priority queue for the shared resource comprises a plurality of client entries each comprising a priority, a local lock state from one of the plurality of secondary nodes, and a responsive global lock state from the first primary node, wherein each local lock state comprises a lock request for access to the shared resource by one or more tasks on the one of the plurality of secondary nodes and each task has an associated lock mode, a fair lock mode that is the associated lock mode of a top waiter task on the one of the plurality of secondary nodes, a concurrent lock mode that is the associated lock mode of at least two tasks on the one of the plurality of secondary nodes that are able to run concurrently when the concurrent lock mode is granted, and a maximum lock mode that is a supremum of the associated lock modes for the one or more tasks on the one of the plurality of secondary nodes, and wherein each responsive global lock state comprises a holdable lock mode indicating a lock mode that was granted to the one of the plurality of secondary nodes, wherein the method further comprises processing the priority queue including:
    (a) processing fair lock mode requests for each individual client entry by granting a lock request in a fair lock mode for the individual client entry when the fair lock mode of the individual client entry is compatible with the fair lock mode of all client entries having a higher priority than the individual client entry and the holdable lock mode of all client entries in the priority queue;
    (b) processing concurrent lock mode requests for each individual client entry by granting a lock request in a concurrent lock mode for the individual client entry when the concurrent lock mode of the individual client entry is compatible with the fair lock mode of all client entries in the priority queue and the holdable lock mode of all client entries in the priority queue; and
    (c) processing maximum lock mode requests for each individual client entry by granting a lock request in a maximum lock mode for the individual client entry when the maximum lock mode of the individual client entry is compatible with the concurrent lock mode of all client entries in the priority queue and the holdable lock mode of all client entries in the priority queue.

3. The method of claim 1, further comprising:
    in response to the first secondary node waiting for a certain lock mode on the shared resource and being blocked by a second secondary node of the plurality of secondary nodes holding a lock on the shared resource:
        determining that the first secondary node has a higher priority than the second secondary node;
        generating a first lock state notification to the second secondary node signalling a reclaim of the held lock; and
        communicating the first lock state notification from the first primary node to the second secondary node.

4. The method of claim 1, wherein each task of the first secondary node has an associated lock mode, and further comprising, at the first secondary node:
    receiving the first global lock state signalling a reclaim of a lock held by the first secondary node;
    identifying a current lock mode of the lock held by the first secondary node and one or more tasks on the first secondary node that are holding or waiting for access to the shared resource and have lock modes that are dominated by the current lock mode; and
    allowing the identified one or more tasks to finish accessing the shared resource and releasing the lock held by the first secondary node to the first primary node to enable the first primary node to grant the lock held by the first secondary node to a remote secondary node.

5. The method of claim 4, further comprising, at the remote secondary node:
    receiving the lock held by the first secondary node from the first primary node after the lock held by the first secondary node has been released by the first secondary node;
    identifying a current lock mode of the lock held by the first secondary node and granted to the remote secondary node on the remote secondary node and one or more tasks on the remote secondary node that are holding or waiting for access to the shared resource and have lock modes that are dominated by the current lock mode of the lock held by the first secondary node and granted to the remote secondary node; and allowing the identified one or more tasks on the remote secondary node to finish accessing the shared resource and releasing the lock held by the first secondary node and granted to the remote secondary node back to the first primary node to enable the first primary node to grant the lock held by the first secondary node and panted to the remote secondary node back to the first secondary node.

6. The method of claim 1, further comprising, at the first secondary node:

detecting and resolving local deadlocks between tasks on the first secondary node;

identifying at least one task on the first secondary node associated with a block of a task on a remote secondary node;

generating lock conflict information comprising local lock waits for one or more tasks on the first secondary node including the identified at least one task; and communicating the generated lock conflict information to a second primary node.

7. The method of claim 1, further comprising:

receiving at a global deadlock detector lock conflict information from two or more secondary nodes;

detecting at the global deadlock detector a global deadlock between tasks on two or more different secondary nodes using the received lock conflict information;

resolving the detected global deadlock at the global deadlock detector by selecting one of the deadlocked tasks on the two or more different secondary nodes;

communicating the selected deadlocked task to a secondary node associated with the selected deadlocked task; and terminating the selected deadlocked task at the secondary node associated with the selected deadlocked task.

8. The method of claim 1, wherein granting the lock request at the first primary node comprises:

granting the lock request at the first primary node based on the merged state information of a plurality of the secondary nodes.

9. A computer program product for managing locks on shared resources in a distributed computer system comprising:

a computer readable storage device having computer readable program code embodied therewith, the computer readable program code comprising computer readable program code configured to:

receive at a first primary node a first local lock state from a first secondary node of a plurality of secondary nodes, wherein the first local lock state comprises a lock request for access to a shared resource, a requested lock mode, and merged state information identifying a current state of a plurality of different locks for shared resources held by a plurality of tasks on the first secondary node and indicating a group lock mode representing a combined lock mode for the plurality of tasks on the first secondary node holding the plurality of different locks on the shared resources, wherein the group lock mode is generated by comparing different lock modes held by the plurality of tasks and identifying a lock mode with a corresponding set of compatible lock modes including each of the different lock modes held by the plurality of tasks;

grant the lock request at the first primary node in response to an absence of conflicts;

generate at the first primary node a first global lock state in response to the first local lock state; and communicate the first global lock state from the first primary node to the first secondary node.

10. The computer program product of claim 9, wherein each task of the first secondary node has an associated lock mode, and the computer readable program code further comprises computer readable program code configured to, at the first secondary node:

receive the first global lock state signalling a reclaim of a lock held by the first secondary node;

identify a current lock mode of the lock held by the first secondary node on the first secondary node and one or more tasks on the first secondary node that are holding or waiting for access to the shared resource and have lock modes that are dominated by the current lock mode; and allow the identified one or more tasks to finish accessing the shared resource and release the lock held by the first secondary node to the first primary node to enable the first primary node to grant the lock held by the first secondary node to a remote secondary node.

11. The computer program product of claim 10, wherein the computer readable program code further comprises computer readable program code configured to, at the remote secondary node:

receive the lock held by the first secondary node from the first primary node after the lock held by the first secondary node has been released by the first secondary node;

identify a current lock mode of the lock held by the first secondary node and granted to the remote secondary node on the remote secondary node and one or more tasks on the remote secondary node that are holding or waiting for access to the shared resource and have lock modes that are dominated by the current lock mode of the lock held by the first secondary node and granted to the remote secondary node; and allow the identified one or more tasks on the remote secondary node to finish accessing the shared resource and release the lock held by the first secondary node and granted to the remote secondary node back to the first primary node to enable the first primary node to grant the lock held by the first secondary node and granted to the remote secondary node back to the first secondary node.

12. The computer program product of claim 9, wherein the computer readable program code further comprises computer readable program code configured to, at the first secondary node:

detect and resolve local deadlocks between tasks on the first secondary node;

identify at least one task on the first secondary node associated with a block of a task on a remote secondary node;

generate lock conflict information comprising local lock waits for one or more tasks on the first secondary node including the identified at least one task; and communicate the generated lock conflict information to a second primary node.

13. The computer program product of claim 9, wherein the computer readable program code further comprises computer readable program code configured to:

receive at a global deadlock detector lock conflict information from two or more secondary nodes;

detect at the global deadlock detector a global deadlock between tasks on two or more different secondary nodes using the received lock conflict information;

resolve the detected global deadlock at the global deadlock detector by selecting one of the deadlocked tasks on the taro or more different secondary nodes;

communicate the selected deadlocked task to a secondary node associated with the selected deadlocked task; and terminate the selected deadlocked task at the secondary node associated with the selected deadlocked task.

14. A system for managing locks on shared resources in a distributed computer system comprising:

a first primary node comprising a first processor and a memory and configured to communicate with a plurality of secondary nodes each comprising a plurality of tasks, and wherein the plurality of secondary nodes collectively comprises a plurality of shared resources;

wherein the first processor is configured with logic to:

receive a first local lock state from a first secondary node of the plurality of secondary nodes, wherein the first local lock state comprises a lock request for access to a shared resource, a requested lock mode, and merged state information identifying a current state of a plurality of different locks for shared resources held by a plurality of tasks on the first secondary node and indicating a group lock mode representing a combined lock mode for the plurality of tasks on the first secondary node holding the plurality of different locks on the shared resources, wherein the group lock mode is generated by comparing different lock modes held by the plurality of tasks and identifying a lock mode with a corresponding set of compatible lock modes including each of the different lock modes held by the plurality of tasks;

grant the lock request in response to an absence of conflicts;

generate a first global lock state in response to the first local lock state; and communicate the first global lock state to the first secondary node.

15. The system of claim 14, wherein each task of the first secondary node has an associated lock mode, and wherein the first secondary node comprises a second processor configured with logic to:

receive the first global lock state signalling a reclaim of a lock held by the first secondary node;

identify a current lock mode of the lock held by the first secondary node on the first secondary node and one or more tasks on the first secondary node that are holding or waiting for access to the shared resource and have lock modes that are dominated by the current lock mode; and allow the identified one or more tasks to finish accessing the shared resource and release the lock held by the first secondary node to the first primary node to enable the first primary node to grant the lock held by the first secondary node to a remote secondary node.

16. The system of claim 15, wherein the remote secondary node comprises a third processor configured with logic to:

receive the lock held by the first secondary node from the first primary node after the lock held by the first secondary node has been released by the first secondary node;

identify a current lock mode of the lock held by the first secondary node and granted to the remote secondary node on the remote secondary node and one or more tasks on the remote secondary node that are holding or waiting for access to the shared resource and have lock modes that are dominated by the current lock mode of the lock held by the first secondary node and granted to the remote secondary node; and allow the identified one or more tasks on the remote secondary node to finish accessing the shared resource and release the lock held by the first secondary node and granted to the remote secondary node back to the first primary node to enable the first primary node to grant the lock held by the first secondary node and granted to the remote secondary node back to the first secondary node.

17. The system of claim 14, wherein the first secondary node comprises a second processor configured with logic to:

detect and resolve local deadlocks between tasks on the first secondary node;

identify at least one task on the first secondary node associated with a block of a task on a remote secondary node;

generate lock conflict information comprising local lock waits for one or more tasks on the first secondary node including the identified at least one task; and communicate the generated lock conflict information to a second primary node.

18. The system of claim 14, further comprising:

a global deadlock detector comprising a second processor configured with logic to:

receive lock conflict information from two or more secondary nodes;

detect a global deadlock between tasks on two or more different secondary nodes using the received lock conflict information;

resolve the detected global deadlock by selecting one of the deadlocked tasks on the two or more different secondary nodes; and communicate the selected deadlocked task to a secondary node associated with the selected deadlocked task.

19. The system of claim 18, wherein the secondary node associated with the selected deadlocked task includes a third processor configured with logic to:

receive the selected deadlocked task from the global deadlock detector;

generate updated lock conflict information for the selected deadlocked task; and terminate the selected deadlocked task.

20. The system of claim 18, wherein the global deadlock detector resides on one of the plurality of secondary nodes.

* * * * *